(12) United States Patent
Hoy et al.

(10) Patent No.: US 11,994,661 B2
(45) Date of Patent: May 28, 2024

(54) SIMULTANEOUS FOCUSING OF AN OPTICAL SYSTEM TO MULTIPLE FOCAL PLANES USING LIQUID CRYSTAL POLARIZATION LENSES

(71) Applicant: Meadowlark Optics, Inc., Frederick, CO (US)

(72) Inventors: Christopher Hoy, Denver, CO (US); Janelle Shane, Lafayette, CO (US); Douglas J. McKnight, Boulder, CO (US)

(73) Assignee: Meadowlark Optics, Inc., Frederick, CO (US)

( * ) Notice: Subject to any disclaimer, the term of this patent is extended or adjusted under 35 U.S.C. 154(b) by 0 days.

(21) Appl. No.: 18/258,315

(22) PCT Filed: Feb. 4, 2022

(86) PCT No.: PCT/US2022/015367
§ 371 (c)(1),
(2) Date: Jun. 19, 2023

(87) PCT Pub. No.: WO2022/170135
PCT Pub. Date: Aug. 11, 2022

(65) Prior Publication Data
US 2023/0400676 A1   Dec. 14, 2023

Related U.S. Application Data

(60) Provisional application No. 63/146,360, filed on Feb. 5, 2021.

(51) Int. Cl.
*G02B 21/00* (2006.01)
*G02F 1/13* (2006.01)
*G02F 1/29* (2006.01)

(52) U.S. Cl.
CPC ..... *G02B 21/0092* (2013.01); *G02B 21/0056* (2013.01); *G02B 21/006* (2013.01); *G02F 1/1313* (2013.01); *G02F 1/294* (2021.01)

(58) Field of Classification Search
CPC ............... G02F 1/294; G02F 2201/30; G02F 2201/307; G02F 2203/22; G02F 2203/24;
(Continued)

(56) References Cited

U.S. PATENT DOCUMENTS 5,519,523 A    5/1996  Madokoro et al.
5,719,650 A *  2/1998  Wefers ............... G02F 1/13471
                                                    349/75
(Continued)

FOREIGN PATENT DOCUMENTS

EP    1420275 B1   10/2008
EP    2137558 B1   10/2011
(Continued)

OTHER PUBLICATIONS

Ngo, Huyen Le, "Office Action Regarding U.S. Appl. No. 15/665,208", Mar. 22, 2019, p. (s) 12, Published in: US.
(Continued)

*Primary Examiner* — Mustak Choudhury
(74) *Attorney, Agent, or Firm* — Neugeboren O'Dowd PC

(57) ABSTRACT

This disclosure describes systems, methods, and apparatus for an optical system including pairs of LCPGs and polarization controllers (e.g., waveplates) that can be controlled to effect multiple simultaneous focal planes, or to simultaneously image multiple focal planes.

47 Claims, 15 Drawing Sheets

(58) Field of Classification Search
CPC ..... G02F 1/1313; G02B 5/18; G02B 27/4233; G02B 3/14; G02B 21/0092; G02B 21/0056; G02B 21/006
See application file for complete search history.

(56) References Cited

U.S. PATENT DOCUMENTS

| | | | |
|---|---|---|---|
| 5,767,828 | A | 6/1998 | Mcknight |
| 5,920,298 | A | 7/1999 | McKnight |
| 6,225,991 | B1 | 5/2001 | McKnight |
| 6,275,277 | B1 | 8/2001 | Walker et al. |
| 6,369,832 | B1 | 4/2002 | McKnight |
| 6,373,497 | B1 | 4/2002 | McKnight et al. |
| 6,452,589 | B1 | 9/2002 | McKnight |
| 6,829,027 | B2 | 12/2004 | McKnight |
| 7,006,747 | B2 | 2/2006 | Escuti et al. |
| 7,196,758 | B2 | 3/2007 | Crawford et al. |
| 7,764,354 | B2 | 7/2010 | Ooi et al. |
| 8,018,557 | B2 | 9/2011 | Muramoto et al. |
| 8,064,035 | B2 | 11/2011 | Escuti et al. |
| 8,144,269 | B2 | 3/2012 | Handschy |
| 8,305,523 | B2 | 11/2012 | Escuti et al. |
| 8,339,566 | B2 | 12/2012 | Escuti et al. |
| 8,358,400 | B2 | 1/2013 | Escuti et al. |
| 8,520,170 | B2 | 8/2013 | Escuti et al. |
| 8,537,310 | B2 | 9/2013 | Escuti et al. |
| 8,610,853 | B2 | 12/2013 | Escuti |
| 8,982,313 | B2 | 3/2015 | Escuti et al. |
| 9,195,092 | B2 | 11/2015 | Escuti et al. |
| 2006/0103778 | A1* | 5/2006 | Ooi ............... G02B 6/2706 349/73 |
| 2008/0204740 | A1 | 8/2008 | Berg et al. |
| 2013/0027656 | A1 | 1/2013 | Escuti et al. |
| 2013/0202246 | A1 | 8/2013 | Meade et al. |
| 2013/0335683 | A1 | 12/2013 | Escuti et al. |
| 2014/0268328 | A1 | 9/2014 | Dorschner et al. |
| 2014/0285878 | A1 | 9/2014 | Escuti et al. |
| 2014/0361990 | A1* | 12/2014 | Leister ............. G02B 30/31 345/156 |
| 2017/0299941 | A1 | 10/2017 | Serati et al. |
| 2019/0075281 | A1 | 3/2019 | Hall et al. |
| 2020/0150323 | A1 | 5/2020 | Tabirian et al. |
| 2020/0300992 | A1 | 9/2020 | Uetsuka |
| 2020/0309701 | A1 | 10/2020 | Tsyboulski et al. |
| 2022/0100030 | A1* | 3/2022 | Dong ............... G02F 1/1343 |

FOREIGN PATENT DOCUMENTS

| | | |
|---|---|---|
| EP | 2137571 B1 | 11/2012 |
| EP | 2388625 B1 | 1/2013 |
| EP | 2350736 B1 | 3/2013 |
| EP | 2137559 A1 | 6/2013 |
| EP | 2764402 A4 | 5/2015 |
| EP | 2764399 A4 | 6/2015 |
| JP | 2014016632 A | 1/2014 |
| JP | 2014089476 A | 5/2014 |
| WO | 2010042089 A1 | 4/2010 |
| WO | 2011014743 A2 | 2/2011 |
| WO | 2013052816 A1 | 4/2013 |
| WO | 2013052834 A1 | 4/2013 |
| WO | 2014159045 A1 | 10/2014 |
| WO | 2019204667 A1 | 10/2019 |

OTHER PUBLICATIONS

Gruber, Stephen S., "Response To Office Action Regarding U.S. Appl. No. 15/655,208", Jun. 12, 2019, p. 24, Published in: US.
PCT, "International Preliminary Report On Patentability Issued in PCT/US2022/015367", Aug. 3, 2023, p. 11, Published in: CH.
PCT, "International Preliminary Report On Patentability Issued in PCT/US2022/015520", Aug. 17, 2023, p. 6, Published in: US.
PCT, "International Search Report and Written Opinion Issued in International Application No. PCT/US2022/015520", May 13, 2022, p. 11, Published in: US.
Oron, D., et al., "Two-photon optogentics", Progress in Brain Research, Jan. 1, 2012, pp. 119-143, vol. 196, Publisher: Elsevier Ltd.
Beciri, Damir, "New technology improves light polarization in LC projectors", Retreived from http://www.robaid.com/tech/new-technology-improves-light-polarization-in-lc-projectors.htm, Jul. 19, 2012, p. 2.
Burrow, Guy M., et al., "Multi-Beam Interference Advances and Applications: Nano-Electronics, Photonic Crystals, Metamaterials, Subwavelength Structures, Optical Trapping, and Biomedical Structures", Retreived from http://www.mdpi.com/2072-666X/2/2/221/htm, Jun. 3, 2011, p. 22.
Boulder Nonlinear Systems, "Core Technologies", Retrieved from http://bnonlinear.com/wp-content/uploads/2014/09/Core-Technologies-White-Paper.pdf, accessed Sep. 30, 2015, Sep. 2014, p. 40, Published in: US.
Vaziri, A., et al., "Reshaping the optical dimesnion in optogentics", Current Opinion in Neurobiology, Dec. 29, 2011, pp. 128-137, vol. 22, Publisher: Elsevier, Ltd.
Hillman. Elizabeth M.C., "Optical brain imaging in vivo: techniques and application from animal to man", Journal of Biomedical Optics, Sep. 1, 2007, p. 28, vol. 12, No. 5.
Komanduri, Ravi K., et al., "A High Throughput Liquid Crystal Light Shutter for Unpolarized Light using Polymer Polarization Gratings", Acquisition, Tracking, Pointing, and Laser Systems Technologies XXV, May 23, 2011, p. 10, vol. 8052.
Papagiakoumou, E. et al., "Scanless two-photon excitation of channelrhodopsin", Nature Methods, Sep. 19, 2010, pp. 848-856, vol. 7, No. 10.
Banas, A., et al., "GPC light shaper for speckle-free one- and two-photon contiguous pattern excitation", Optical Society of America, Feb. 27, 2014, p. 12, vol. 22, No. 5.
Pain, F., et al., "Comparison of twisted and parrallel nematic liquid crystal polarisation contollers. Application to a 4 X 4 free space optical switch at 1.5 um", Optics Communications, Jul. 1, 1997, pp. 199-204, No. 139, Publisher: Elsevier.
Rodriquez, Kari, "International Search Report and Written Opinion Regarding Application No. PCT/US22/15367", Apr. 18, 2022, p. 18, Published in: US.

* cited by examiner

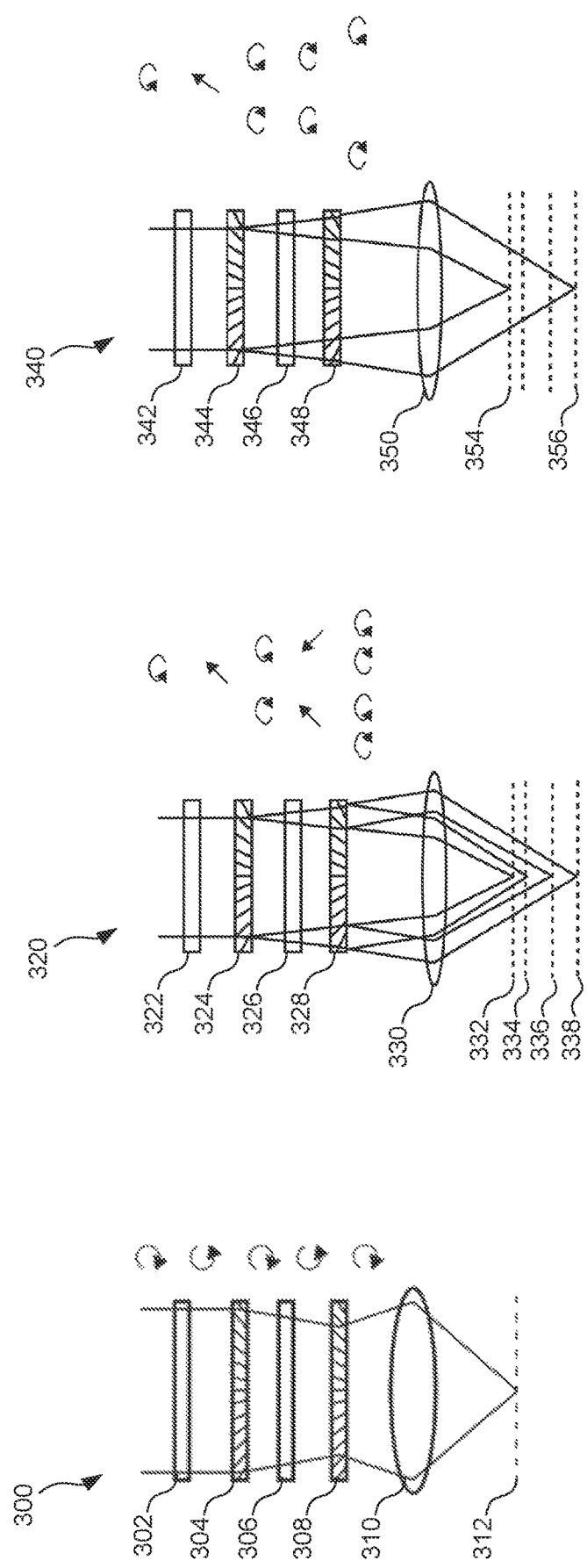

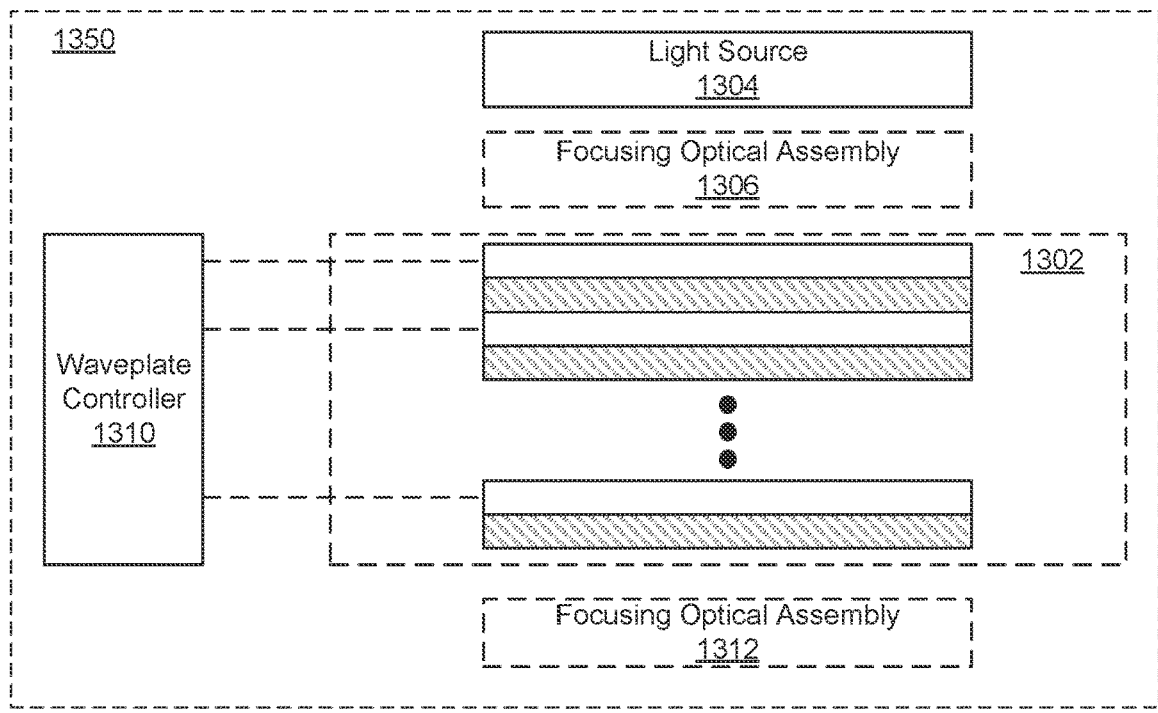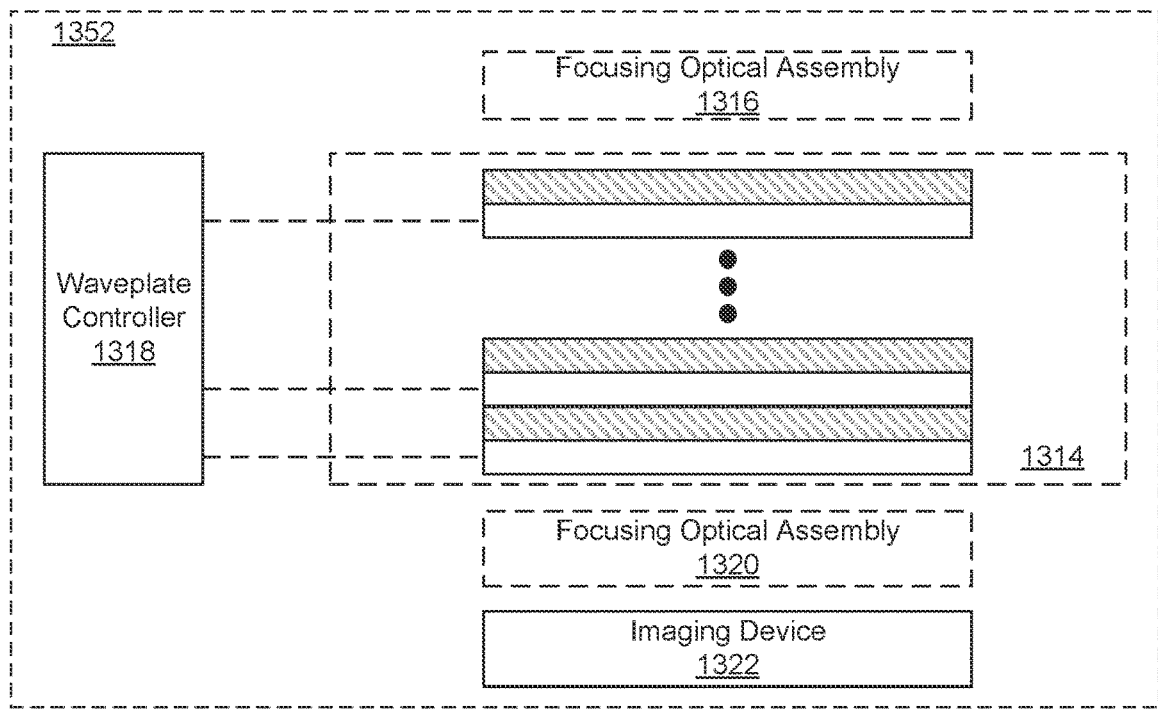
FIG. 13

SIMULTANEOUS FOCUSING OF AN OPTICAL SYSTEM TO MULTIPLE FOCAL PLANES USING LIQUID CRYSTAL POLARIZATION LENSES

CLAIM OF PRIORITY UNDER 35 U.S.C. § 119

The present Application for Patent is a national phase of PCT Patent Application No.: PCT/US22/15367 filed on Feb. 4, 2022 entitled "SIMULTANEOUS FOCUSING OF AN OPTICAL SYSTEM TO MULTIPLE FOCAL PLANES USING LIQUID CRYSTAL POLARIZATION LENSES" which claims priority to Provisional Application No. 63,146,360 entitled "SIMULTANEOUS FOCUSING OF AN OPTICAL SYSTEM TO MULTIPLE FOCAL PLANES USING LIQUID CRYSTAL POLARIZATION LENSES" filed Feb. 5, 2021, and assigned to the assignee hereof and hereby expressly incorporated by reference herein.

FIELD OF DISCLOSURE

The present disclosure relates to optical systems and, more particularly, to liquid crystal polarization grating lenses (LCPG Lenses).

DESCRIPTION OF RELATED ART

Microscope systems, or optical systems in general, are often used for observing events that happen in three dimensions. One strategy for observing three-dimensional events is to use an optical system whose focal plane can be changed. For example, mechanical devices such as a movable sample stage or piezo tunable microscope objective can be used to serially excite or image different focal planes. However, some 3D events of interest occur simultaneously or nearly simultaneously, too quickly for currently available serial excitation and/or imaging techniques. Examples include studying phenomena such as blood flow, intracellular transport, out-of-plane organism motion, and other dynamical processes. For this reason, a technique for simultaneous imaging of multiple focal planes would be advantageous. For example, see "Simultaneous multifocal, multiphoton, photon counting microscopy" by Carriles et al, which uses polarizing beamsplitters to excite different focal planes with orthogonal polarizations of laser light; is limited to two focal planes, and this method is not truly simultaneous since each of the two polarizations is delivered by alternating laser pulses. Similar methods for splitting an excitation laser into multiple beams exist using arrays of aligned mirrors (see "Application of multiline two-photon microscopy to functional in vivo imaging" by Kurtz et al) or diffractive optical elements (see "Two-photon imaging with diffractive optical elements" by Watson et al); however, these methods are difficult to align and to integrate with commercial microscopes, and are designed for fixed numbers of excitation planes. A more flexible method is to use a spatial light modulator (SLM; see "Simultaneous multi-plane imaging of neural circuits" by Yang et al); however, SLMs are expensive and add-on SLM modules are not available for many commercial microscopes.

One method of quickly and easily changing the field of view of an imaging system, and/or changing how the system directs light, is exemplified in U.S. Pat. No. 8,982,313. This system uses, typically, several stages, each comprising a single liquid crystal cell to control the polarization of the light passing through it, and one or more liquid crystal polarization grating (LCPG) steering elements. (Also called geometric-phase holograms, geometric phase elements, Pancharatnam-Berry phase optical elements, and diffractive waveplates.) That this steering can occur in all three dimensions, including axially along the optical axis of the imaging system, can be readily appreciated. That is, the LCPGs can be linear gratings, or lenses, or any combination. "Fabrication of ideal geometric-phase holograms with arbitrary wavefronts" by Kim et al, "Pancharatnam-Berry phase optical elements for wave front shaping in the visible domain: Switchable helical mode generation" by Marrucci et al, and U.S. Patent Application No. 2021/0231952 teach a generalization to any Zernike polynomial. LCPG beam steering devices are advantageous for their high efficiency, their compact size, and the speed of control by means of their liquid crystal cells.

However, prior art in LCPG systems is limited to systems designed to produce only one focal plane at a time. For example, U.S. Pat. No. 10,120,112 uses spherical aberration correction to focus optical radiation to "a point in space" or "a line segment in space". U.S. Pat. No. 10,191,191 uses a specific geometrically increasing series of LCPG lens focal lengths in combination specifically with "circularly polarized light", which will produce one focal plane at a time.

SUMMARY OF THE DISCLOSURE

The following presents a simplified summary relating to one or more aspects and/or embodiments disclosed herein. As such the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below To achieve simultaneous multi-plane focusing, this disclosure describes embodiments of a liquid crystal polarization grating lens (LCPG lens) system, which through tuning of the elliptical output state of liquid crystal cells between the extremes of linear and circular polarization states, allows flexible selection of one or more simultaneous focal planes, as well as the control of the proportion of radiation sent to each focal plane. Not only can multiple planes be selected at the same time, but switching times between planes can be greatly reduced over known techniques, and thus this technology can also be referred to as dynamic focusing. This disclosure reproduces some of a spatial light modulator's ability to select multiple simultaneous focal planes and/or output steering angles and/or other wavefront shaping functions, while yielding a substantially lower cost and size, and a substantially higher efficiency.

Some aspects of the disclosure can be characterized as an optical system with a controllable liquid crystal polarization grating (LCPG) stack configured to produce or image two or more simultaneous focal planes. The optical system can include first and second LCPG lenses and one or more polarization controllers such as waveplates. The polarization controllers can be configured to selectively adjust a polarization of light entering one or both of the first and second LCPG lenses and in this way controlling a number and location of each of the two or more focal planes. The optical system can be configured for epi or transillumination.

In some embodiments, the stack can include more than two LCPG lenses. Typically the polarization controllers are arranged adjacent to a corresponding LCPG lens and in some embodiments, there may be a polarization controller for each LCPG lens. The optical system disclosed herein can achieve multiple simultaneous focal planes and can move these focal planes at a very high speed and without moving parts, and can therefore referred to as a non-mechanical beam steering system or a dynamic focusing system. Each of the LCPG lenses can be individually controllable via a controller, such as a waveplate controller electrically controlling a waveplate or other polarization controller that corresponds to, or is adjacent, to a given LCPG lens. In some embodiments, the optical system can be incorporated into a microscope, for instance, being arranged between at least two optical elements or lenses of the microscope and serving as a remote focusing system. In some embodiments, at least one of the polarization controllers is non-uniform, for instance having segments with different properties, or having a gradient of properties. In some embodiments, at least one of the one or more polarization controllers is selected from: a waveplate switch, a passive waveplate, a segmented and/or pixelated waveplate, a gradient waveplate, a spatial light modulator, a polarizer, and a guest-host liquid crystal device.

Additional aspects of the disclosure can be characterized as a dynamic focusing system having a light source, an imaging sensor, a first LCPG lens, a second LCPG lens, a first polarization controller, a second polarization controller, and a controller electrically coupled to the first and second polarization controllers. The first polarization controller can be configured to control a polarization of polarized light entering the first LCPG lens and the second polarization controller can be configured to control a polarization of polarized light entering the second LCPG lens. The controller can be configured to control a state of the first and second polarization controllers to control two or more focal planes of the dynamic focusing system. In some cases these two or more focal planes can exist at the same time and they can be moved or changed in number very rapidly and without moving parts to effect these changes. The dynamic focusing system can be configured for epi or transillumination.

In some embodiments, the dynamic focusing system can include more than two LCPG lenses. Typically the polarization controllers are arranged adjacent to a corresponding LCPG lens and in some embodiments, there may be a polarization controller for each LCPG lens. The dynamic focusing system disclosed herein can achieve multiple simultaneous focal planes and can move these focal planes at a very high speed and without moving parts, and can therefore be referred to as a non-mechanical beam steering system. Each of the LCPG lenses can be individually controllable via a controller, such as a waveplate controller electrically controlling a waveplate or other polarization controller that corresponds to, or is adjacent, to a given LCPG lens. In some embodiments, the dynamic focusing system can be incorporated into a microscope, for instance, being arranged between at least two optical elements or lenses of the microscope.

In some embodiments, at least one of the polarization controllers is non-uniform, for instance having segments with different properties, or having a gradient of properties.

In some embodiment, at least one of the one or more polarization controllers is selected from: a waveplate switch, a passive waveplate, a segmented and/or pixelated waveplate, a gradient waveplate, a spatial light modulator, a polarizer, and a guest-host liquid crystal device Other aspects of the disclosure can be characterized as a method of dynamic focusing to produce or image two or more simultaneous focal planes. The method can include providing a light source or an imaging source, providing a first LCPG-polarization controller optical stack comprising at least one LCPG and at least one polarization controller, directing polarized light through the first LCPG-polarization controller optical stack, and selecting a state of at least one polarization controller to select a number and location of the two or more simultaneous focal planes.

Other aspects of the disclosure can be characterized as an optical system having a light source or imaging device, a first LCPG-polarization controller optical stack, and a waveplate controller. The first LCPG-polarization controller optical stack can have at least one LCPG and at least one polarization controller. Polarized light is directed through the first LCPG-polarization controller optical stack. The waveplate controller can have a non-transitory tangible computer readable storage medium, encoded with processor readable instructions to perform a method for dynamic focusing to produce or image two or more simultaneous focal planes. The method can include instructing at least one polarization controller to switch between two states thereby changing a number and/or location of the two or more simultaneous focal planes.

BRIEF DESCRIPTION OF THE DRAWINGS

Various objects and advantages and a more complete understanding of the present disclosure are apparent and more readily appreciated by referring to the following detailed description and the appended claims when taken in conjunction with the accompanying drawings.

FIG. 3A illustrates a combination of multiple LCPG lenses with half waveplate (HWP) switches, tuning an optical system's focus to a single selected focal plane.

FIG. 3B illustrates the optical stack of FIG. 3A tuning the optical system's focus to a first set of focal planes (e.g., 4).

FIG. 3C illustrates the optical stack of FIG. 3A tuning the optical system's focus to a second set of focal planes (e.g., 2).

FIG. 13 illustrates a first optical assembly, one or more focal planes, and a second optical assembly.

DETAILED DESCRIPTION OF EMBODIMENTS OF THE DISCLOSURE

Figure 1:
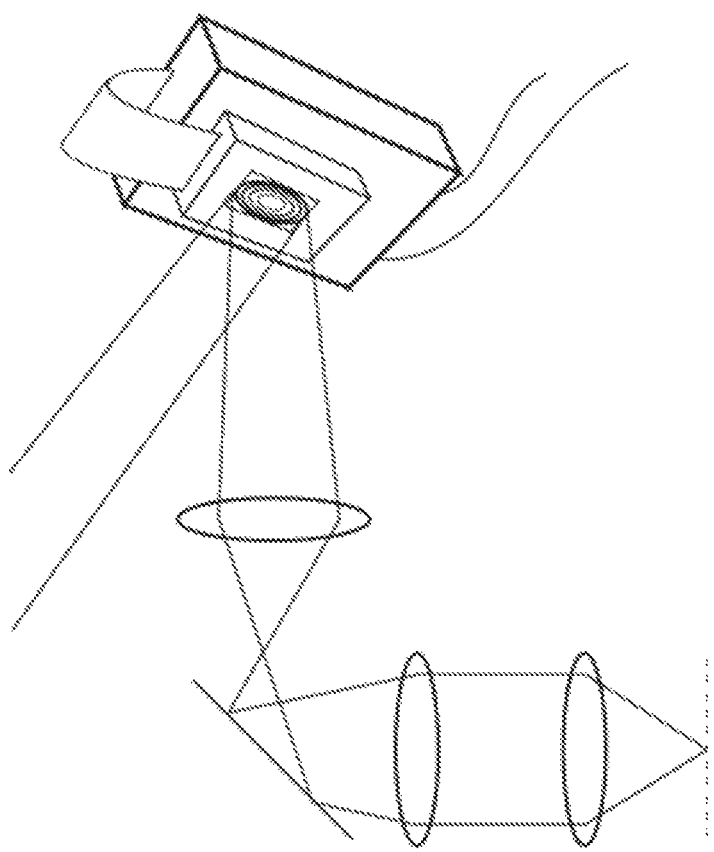
FIG. 1 illustrates a known use of a Spatial Light Modulator (SLM) to change the focus of an optical system.

This disclosure is described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

The flowcharts and block diagrams in the following Figures illustrate the architecture, functionality, and operation of possible implementations of systems, methods and computer program products according to various embodiments of the present disclosure. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions For the purposes of this disclosure, a "focusing optical system" includes any combination of one or more components that changes a focal plane of incident light. These components can operate on any range of frequencies or wavelengths and are not limited to optical wavelengths.

Although "light" generally means electromagnetic radiation with a wavelength in the visible region of the electromagnetic radiation with a wavelength in the visible region of the electromagnetic spectrum, it should be understood that the usage of the term "light" in this description is not restrictive, in the sense of limiting the design and application to applications in the visible region of the spectrum. In general, all the designs and concepts described herein apply to operation over a wide range of the electromagnetic spectrum, including the microwave, infrared, visible, ultraviolet, and X-ray regions, to name a few.

Liquid crystal polarization grating lenses (LCPG lenses), also called geometric phase (GP) lenses, geometric phase holograms, geometric phase elements, geometric phase gratings, Pancharatnam-Berry phase optical elements, diffractive waveplate lenses, or waveplate lenses, use patterned liquid crystal to apply a lens phase function to incident light, see FIG. 1. These lenses will act as a positive or negative lens depending on the handedness of incident circularly polarized light. If incident light is right hand circularly polarized (RCP), see FIG. 2B, the lens phase function will have a first sign, and if the incoming light is left hand circularly polarized (LCP), see FIG. 2C, the lens function will have the opposite sign. Thus, by choosing the handedness of polarization of incident light, one can select whether the lens will function as a positive or negative lens without any change to the lens itself.

Figure 2A:
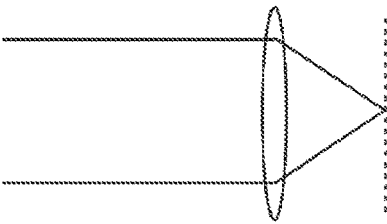
FIG. 2A illustrates the focal plane of an optical system without a LCPG lens.
Figure 2B:
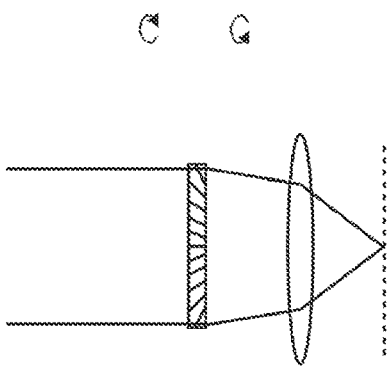
FIG. 2B illustrates the effect of a LCPG lens on the focal plane of an optical system having right hand circular polarization (RHCP) light incident on the LCPG.
Figure 2C:
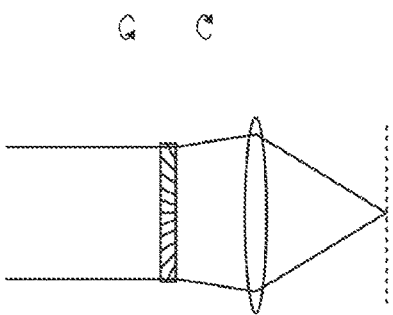
FIG. 2C illustrates the effect of a LCPG lens on the focal plane of an optical system having left hand circular polarization (LHCP) light incident on the LCPG.
Figure 2D:
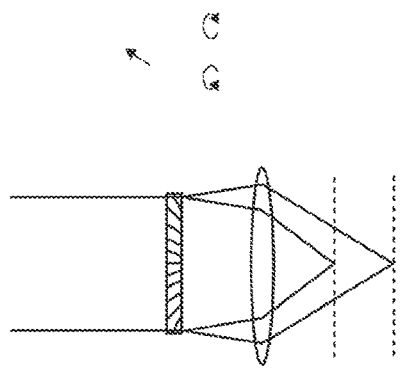
FIG. 2D illustrates that a LCPG lens generates two distinct focal planes when input light is linear polarized.

If incident light is linearly polarized (LP), see FIG. 2D, then the lens will behave both as a positive and negative lens, splitting the incident light into two portions with distinct polarization and distinct focal planes. The industry has long sought to undo this splitting by using subsequent lenses to refocus the two divergent beams into a single focal plane. For instance, U.S. Patent Publication No. 2020/0150323 and U.S. Pat. No. 10,191,191, which are both assigned to Beam Engineering for Advanced Measurements, Co., teach how to correct for aberrations by refocusing right and left circularly polarized beams split apart by a first diffractive waveplate (i.e., matching focal lengths of the two beams to ensure a single output plane) (see especially FIGS. 7 and 8).

However, this disclosure recognizes that the ability of an LCPG lens to split linearly polarized light into left and right circularly polarized light having different degrees of convergence and divergence, can be advantageously used to achieve multiple simultaneous focal planes. Not only can this system be used to image simultaneous phenomena happening in widely spaced focal planes, but this disclosure teaches how they can also be imaged simultaneously even if the two focal planes are very different in brightness; i.e., small fluorescently tagged proteins above a brightly tagged cell membrane. The simultaneous focal planes can also be made to have properties of polarization and/or angular frequency that enable them to be distinguished in an imaging system.

LCPG lenses can be used in combination with a fixed-focus lens, such as a microscope objective, to change the fixed lens's focal plane. FIGS. 2B and 2C illustrate how the polarization handedness of the incoming light can determine in which direction the focal plane is shifted, and how incoming light that is linearly polarized (LP) will produce two focal planes (see FIG. 2D): one focal plane for its RCP component, and one focal plane for its LCP component.

In one embodiment, this disclosure uses a single LCPG lens in combination with a focusing optical system (e.g., a fixed lens), to produce two simultaneous focal planes from incident LP light as illustrated in FIG. 2D.

In another embodiment, multiple LCPG lenses can be arranged in line with a focusing optical system (e.g., a fixed lens), to produce two or more simultaneous focal planes from incident LP light, where the locations of those focal planes are determined by the focal lengths of the LCPG lenses. FIGS. 2B through 2D show such a focusing optical system between the LCPG and the focal plane(s).

Adding waveplates or other polarization controllers to the optical stack, for instance as seen in FIGS. 3A-3C, provides one means of controlling the handedness of light incident on each LCPG, and hence a means to control whether the LCPG acts as a positive lens, a negative lens, or both (and splits incident light into two portions with distinct polarizations and focal planes). In particular, one or more waveplates can be used to control a degree and/or handedness of circular polarization incident on the LCPG lenses. The waveplates can be adjustable (switched) or passive (non-switched), or a mixture thereof. An adjustable waveplate can be continuously adjustable to allow for continuous adjustment of the proportion of the incident light that experiences the LCPG as converging or diverging. As described above, the incident polarization on each LCPG lens determines whether an LCPG lens acts as a positive or negative lens or simultaneously both.

For instance, FIG. 3A shows an embodiment where a series of waveplates, LCPG lenses, and a focusing optical system can be used to focus incident light onto a single focal plane. In this embodiment, the optical stack 300 includes a first waveplate 302, a first LCPG lens 304, a second waveplate 306, a second LCPG lens 308, and a focusing optical system 310. Here, the first and second waveplates 302, 306 are half waveplates, or waveplates or other optical components that impart net zero or half wave relative phase delay to the different polarization components. This can be seen by the handedness of the incident light reversing as it passes through each waveplate 302, 306. Since the incident light on the LCPG lenses 304, 308 is circularly polarized, the LCPG lenses 304, 308 produce light with a single focal plane, and the result of the stack 300 is a single focal plane 312.

Multiple half waveplates or any other waveplate or combination of waveplates that impart a net zero or net half wave relative phase delay can be implemented in the place of 302 and 306 to achieve this single focal plane 312 result.

Note that any waveplate, including adjustable waveplates, may be replaced by a waveplate with a retardance value that is higher or lower by an integer number of waves of retardance without changing the effect on the resulting polarization state. This property allows one to choose retardance values which may be advantageous for other reasons, such as ease of manufacture.

Waveplates or polarization controllers are also known as variable phase retarders, and include optical components that are capable of controlling polarization through the optical component by applying electric fields, changing temperature, exposure to a light beam, etc. In some embodiments, a polarization controller includes a liquid crystal sandwiched between substrate coated with transparent electrodes.

FIG. 3B shows an embodiment of a series of waveplates, LCPG lenses, and a focusing optical system that can be used to focus incident light simultaneously onto multiple focal planes. In this embodiment, the optical stack 320 includes a first waveplate 322, a first LCPG lens 324, a second waveplate 326, a second LCPG lens 328, and a focusing optical system 330 (e.g., a focusing lens). Here, the first and second waveplates 322, 326 are quarter waveplates, or waveplates that impart a quarter period of phase delay (although any waveplates imparting a net quarter or ¾ wave phase delay could be used). This can be seen by the handedness of the incident light changing from circular to linear as it passes through each waveplate 322, 326. Note that this polarization change from circular to linear could also be accomplished with a linear polarizer or other element that passes just one polarization component. Since the incident light on the LCPG lenses 324, 328 is linearly polarized, the LCPG lenses 324, 328 split the incident light into two substantially equal amplitude parts. Thus, where light of a single focal plane enters an LCPG lens, light with two focal planes emerges, and where light of two focal planes enters an LCPG lens, light with four focal planes emerges. Here, circularly polarized light is turned to linear via the first waveplate 322, and this linearly polarized light is then split into two circularly-polarized portions in the first LCPG lens 324, where the two circularly-polarized portions of light have distinct focal planes. These two circularly polarized portions of light are then delayed by a quarter period in the second waveplate 336 and converted back to linearly polarized light, each of these two portions having opposing linear polarization. The two linearly-polarized portions of light then pass through the second LCPG lens 328 and are split into four circularly-polarized portions, where the four circularly-polarized portions of light have four distinct focal planes (the light is diverging at this point so the focal planes are actually 'above' the second LCPG lens 328). These four portions are then focused through the focusing optical system 330 onto four distinct focal planes 332, 334, 336, 338. As seen, by selecting quarter waveplates instead of half waveplates, or waveplates that impart a net quarter wave or three-quarter wave delay to incident circularly polarized light, a similar stack to that seen in FIG. 3A can be designed, but achieving multiple simultaneous focal planes with no moving parts. Alternatively, the waveplates can be switchable and thus switching of the waveplates can allow movement between FIG. 3A and FIG. 3B (e.g., see FIG. 3C).

Multiple quarter waveplates or any other waveplate or combination of waveplates or other optical components that impart a net quarter or three-quarter period phase delay can be implemented in the place of 322 and 326 to achieve this multi-focal-plane 332, 334, 336, 338 result. Additionally, any waveplates or other optical components that convert circularly polarized to linearly-polarized light can be used in place of the waveplates 322, 326, including components that pass only a single polarization component such as linear polarizers.

FIG. 3C shows another embodiment of a series of waveplates, LCPG lenses, and a focusing optical system that can be used to focus incident light simultaneously onto multiple focal planes. This embodiment is similar to FIG. 3B in that a first waveplate 342 converts circularly polarized light to linearly-polarized light and this in turn is split into two portions of oppositely polarized light by a first LCPG 344. However, a second waveplate 346 is a half waveplate or imparts a net zero phase delay, such that circularly polarized light enters a second LCPG lens 348. Consequently, the second LCPG lens 348 transmits two portions of light—the same number that entered—and there are ultimately two focal planes 354, 356 rather than four as in FIG. 3B. This example shows that not all waveplates have to have the same phase delay and by selecting different waveplates, or switching the phase delay of one or more waveplates in the optical stack 340, one can select or change a number, location, and/or illumination of different focal planes.

Multiple quarter waveplates or any other waveplate or combination of waveplates that impart a net quarter period phase delay can be implemented in the place of 342 to achieve this multi-focal-plane 354, 356 result.

In other embodiments, one or more of the waveplates may be switchable. In such embodiments, FIGS. 3A, 3B, and 3C could represent different states of the same stack (i.e., single focal plane, four focal planes, and two focal planes). Assuming that the waveplates 302 and 306 are switchable, FIG. 3A shows the resulting single focal plane 312 when the waveplates are both switched to a half wave state, or a state imparting no net phase delay. FIG. 3B shows the resulting four focal planes 332, 334, 336, 338 when the waveplates are both switched to a quarter wave state, or a state imparting a net quarter wave relative delay. FIG. 3C shows the resulting two focal planes 354, 356 when the waveplates are both switched to opposing states. From this it can be seen that an optical stack comprising any combination of switchable (and optionally some non-switchable) waveplates alternating with LCPG lenses can be used to generate a selectable number of focal planes through a focusing optical system.

Furthermore, the waveplates can be adjusted so as to present each LCPG with a desired mix of left-handed and right-handed circular polarization. One may consider the example shown in FIG. 3B to be a special case in which both waveplates 322 and 326 are adjusted (or chosen) such that they create linearly polarized light, which is an equal mix of left and right circular polarization. The equal mix of left and right circular polarization causes the beam to be split into two substantially equal amplitude beams at LCPG 324. The two beams exiting LCPG 324 are each circularly polarized, and each is transformed into linear polarization by the waveplate 326. Since both these linearly polarized beams are comprised of an equal mix of right and left circularly polarized light, these two beams are each split into two equal amplitude beams by LCPG 328, resulting in a total of four equal amplitude beams and four equal amplitude focal planes. Note that in this description it is helpful to imagine a collimated illumination beam progressing from top to bottom in FIG. 3B which is focused into four equal-power spots at four focal planes of a microscope or other magnifying optical assembly. In fact, the system has wide angular acceptance and works equally well for light flowing in either direction, so the system shown in FIG. 3B would image four planes at the bottom of the figure onto a microscope detector or other imaging device with equal efficiency when the light is flowing from bottom to top of FIG. 3B.

The waveplates may be adjusted to retardances other than the special case to weight the flow of light to and from the planes in different proportions.

Although this discussion has focused on waveplates as a polarization selector, in other embodiments, a polarization selector can include a waveplate switch, a passive waveplate, a segmented and/or pixelated waveplate, a gradient waveplate, a spatial light modulator, a polarizer, or a guest-host liquid crystal device.

Figure 4:
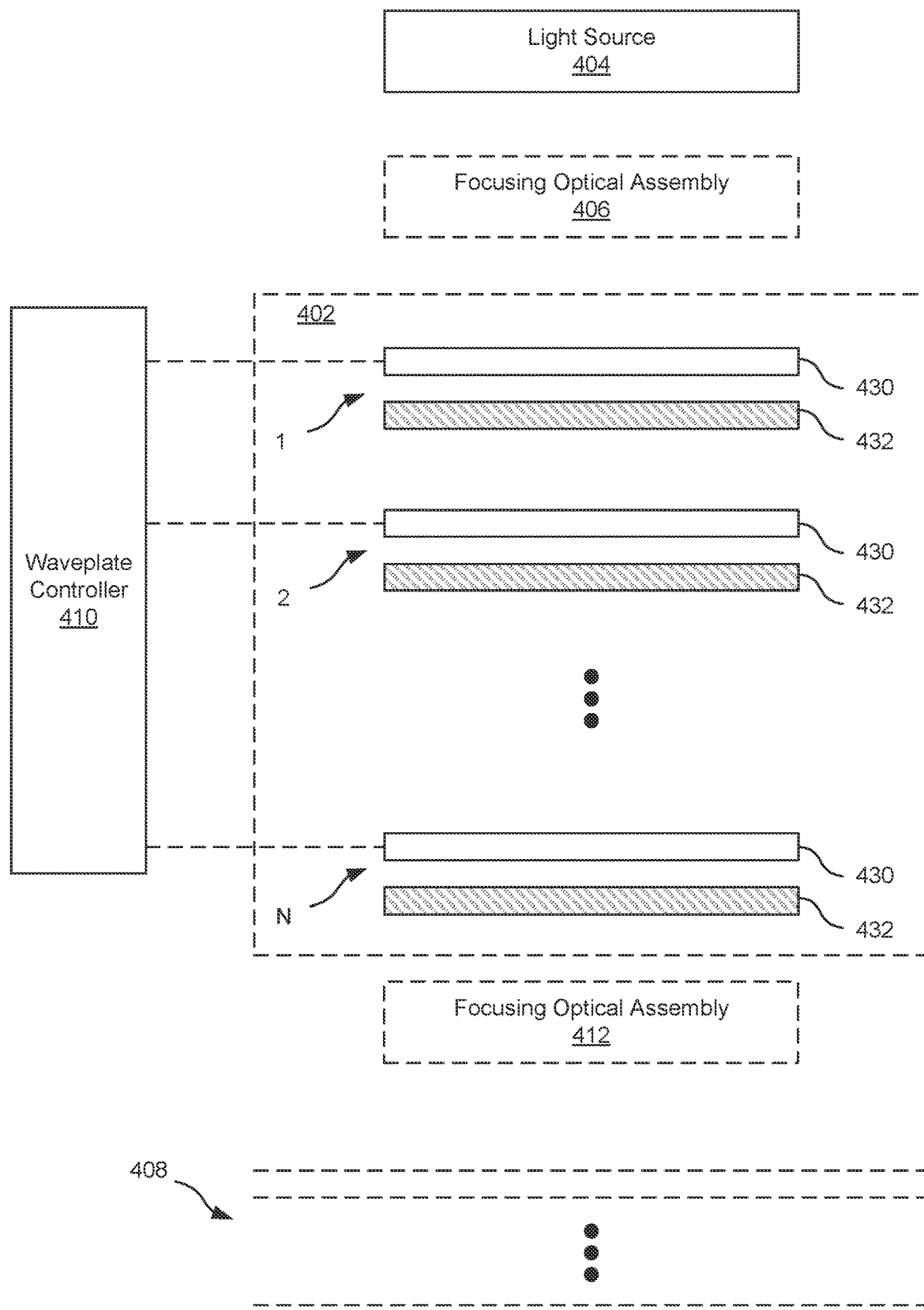
FIG. 4 illustrates an embodiment of an optical stack for focusing a light source to multiple simultaneous focal planes using pairs of switched waveplates and LCPG lenses and a controller thereof.

FIG. 4 illustrates an optical system including an optical stack 402 along with a light source 404, an optional first focusing optical assembly 406, an optional second focusing optical assembly 412, one or more focal planes 408, and a waveplate controller 410. The optical stack 402 can include two or more pairs of waveplates 430 and LCPG lenses 432, where the number of pairs is N and N can be any integer of 1 or more (N=1 is possible where incident light is linear). The waveplates 430 in each of the N pairs can be switched or fixed, and if switched, then the waveplate controller 410 can provide control signals for switching those of the waveplates 430 that are switchable. Between the one or more focal planes 408 and the optical stack 402, can be a second optional focusing optical assembly 412. Selection of N during design of the optical stack 402 provides a way to select a maximum number of focal planes that the optical stack 402 can achieve, namely $2^N$. Given this maximum, if one or more of the waveplates 430 are switchable, then the number of focal planes can be adjusted during operation to any value between 1 and $2^N$, and the system can select and weight different ones, pairs, etc. of the focal planes for imaging at the same time, thereby allowing variable depth of imaging in multiple simultaneous planes. In other words, and assuming one or more switchable waveplates 430, the waveplate controller 410 can be used to adjust a number of focal planes from 1 to $2^N$ during operation of the system in FIG. 4. Changes between numbers of focal planes can be made as fast as the controller 410 and/or waveplates 430 can switch. The controller 410 can also be used to adjust the focal planes being imaged at any time, for instance, allowing an imaging microscope system to follow an entity moving vertically through a fluid, or to focus on two or more different entities at different depths moving vertically through a fluid, or to very rapidly switch the focus between these different entities at different depths, to name a few non-limiting examples.

Furthermore, as N increases, the number of focal planes increases by up to 2 to the power of N. Some use cases may not call for many focal planes to be used at the same time, but instead may call for different combinations of the planes to be selected in rapid succession or at least to allow rapid selection between two or more of a large number of focal planes. For instance, in medical imaging there may be a desire to view one or two focal planes at a time, and to switch between focal planes that are spaced by mere microns from each other. Such an application could see the controller 410 switching all but one waveplate 430 (or two, or three, etc.) to a half wave value, or net zero phase delay, and switching one of the waveplates 430 to a quarter wave or three-quarter wave value. A medical imaging technician may want to see different layers within tissue, and by adjusting a digital "knob" they may instruct the controller 410 to switch "on" a given one of the waveplates 430, where that waveplate 430 is set to a quarter wave or three-quarter wave value while all remaining waveplates 430 are set to a half wave value. In this way a user can rapidly switch between focal planes, or seemingly adjust a focus of an imaging device, without the imaging device seeing any movement of components. Given the speed of non-mechanical focusing, this optical system can also be referred to as a dynamic focusing system. This not only could allow greater longevity of the device and more rapid switching between focus planes, but may also cut down on vibration that is often associated with changing focal planes using traditional mechanical lens or sample adjustments—vibrations that are amplified when magnification is involved. The device's focusing behavior will also be independent of gravitational effects that degrade the performance of liquid lenses for focusing in orientations other than vertical.

Furthermore, the polarization need not be modified uniformly; the use of segmented or gradient waveplate switches, for example, would permit different sections of the input light aperture to be switched independently (see, e.g., FIGS. 8-11). With annular segmented waveplate switches, the illumination from each segment reaches the sample plane with a different radial frequency, as well as with a different degree of convergence. This causes the different sample planes to be frequency-tagged, which will aid in the important step of disambiguation of simultaneous laterally-overlapping signals later. In addition, by choosing the size of the waveplate switch regions, or by switching multiple regions of a segmented waveplate to a same state, the proportion of light in a given focal plane can be increased (or decreased by switching regions of a segmented waveplate into different states). These adjustments could be useful, for example, in microscopy where multiple signals of different strengths need to be collected simultaneously from different planes without the stronger signal overwhelming the detector.

The first optional focusing optical assembly 406 and the second optional focusing optical assembly 412 can each comprise one or more imaging or lensing components capable of modifying a focal plane of light passing therethrough.

The optical stack 402 and waveplate controller 410 can be implemented in a variety of optical systems, such as microscopes, telecommunication devices that use polarization filtering to multiplex imaging systems, and laser scanning or machining systems. For instance, in the case of a microscope, the various optical components of the microscope could be split between the first and second focusing optical assemblies 406, 412, such that the optical stack 402 is arranged between these optical components. In this way, the optical stack 402 could be inserted into existing or OEM microscopes to turn a traditional single-focal-plane microscope into a multi-focal-plane microscope, and/or one that can select between and manipulate the locations of one or more focal planes. Alternatively, the second focusing optical assembly 412 can be part of the optical stack 402 and the optical stack 402 can be retrofitted to existing optical systems between a bottommost optical element, such as the focusing optical assembly 406, and the sample, such that the second focusing optical assembly 412 becomes the last optical element in the system.

Although this discussion has focused on waveplates as a polarization selector, in other embodiments, a polarization selector can include a waveplate switch, a passive waveplate, a segmented and/or pixelated waveplate, a gradient waveplate, a spatial light modulator, a polarizer, or a guest-host liquid crystal device.

Figure 5:
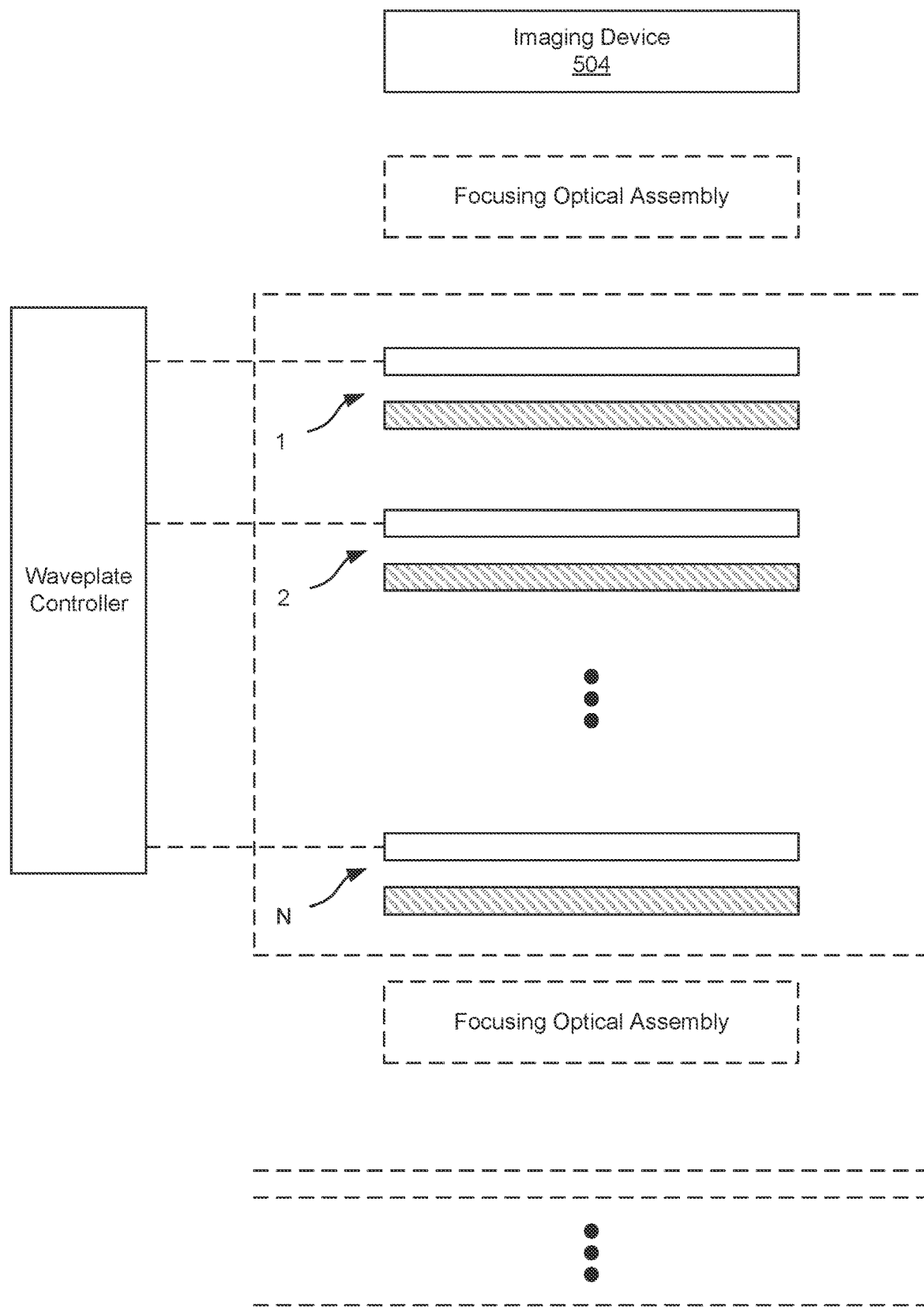
FIG. 5 illustrates an embodiment of an optical stack for imaging multiple simultaneous focal planes to an imaging device using pairs of switched waveplates and LCPG lenses and a controller thereof.

FIG. 5 illustrates a similar setup to that of FIG. 4, but with an imaging device 504 replacing the light source 404.

It should be noted, that although "gaps" are illustrated between elements in the illustrated optical stacks, such gaps are illustrative only, and in practice the optical stack would likely be formed without gaps between elements in the optical stack. In other words, waveplates may be arranged directly atop LCPG lenses and vice versa, often with materials selected to match indices of refraction at each interface between adjacent layers. At the same time or in the alternative, optical fluid can be arranged between layers to minimize reflections (e.g., liquid optically clear adhesive, optically clear adhesive tape).

Additionally, the LCPG focusing elements are not required to be replacements of simple spherical lenses. They may be patterned to behave equivalently to aspheric or anamorphic elements and because the effect of each element may be cancelled by a matching element, the designer has the capability to add and remove a variety of kinds of aberration correction at will.

Figure 6:
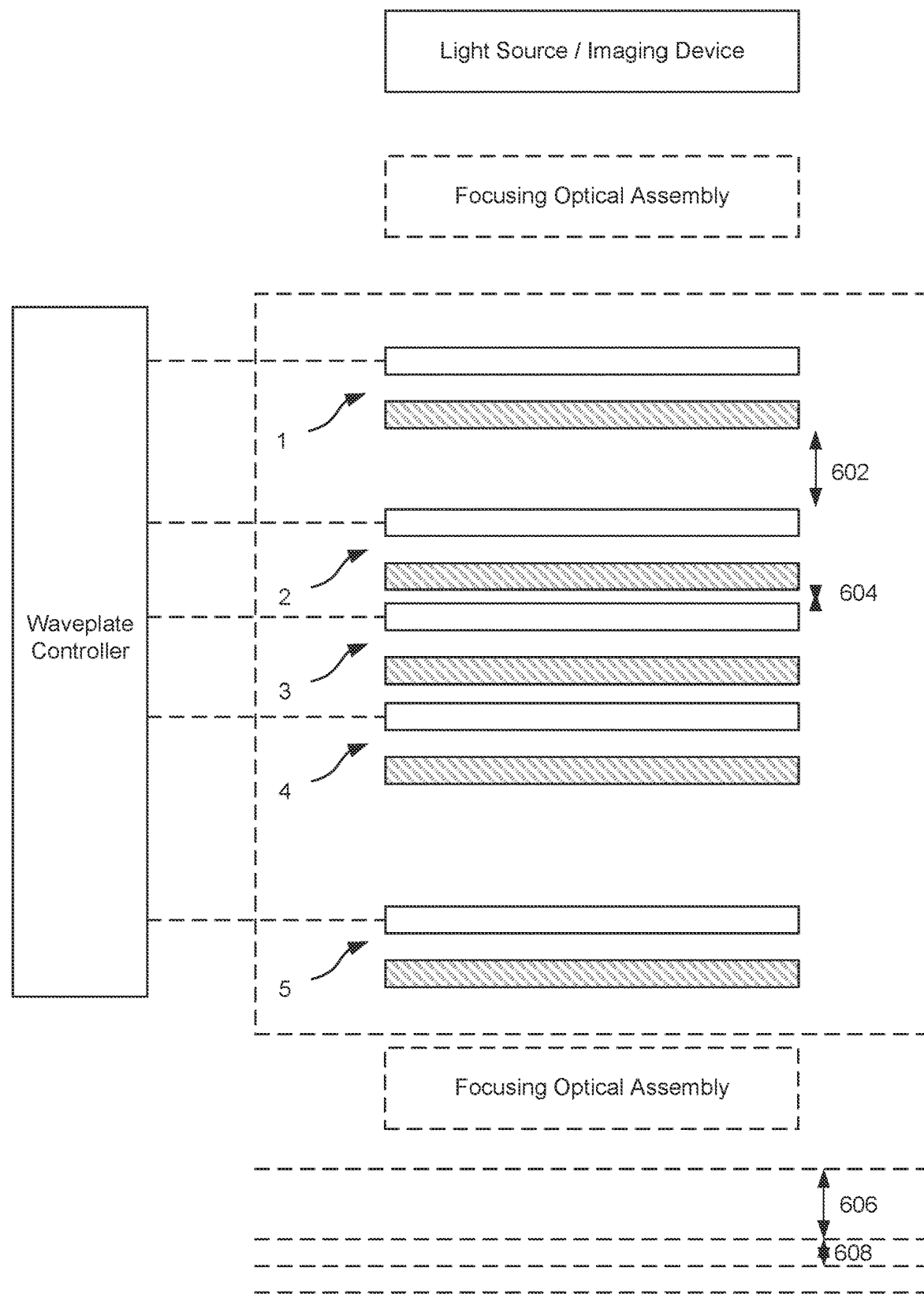
FIG. 6 illustrates an embodiment of an optical stack for focusing a light source to multiple simultaneous focal planes or imaging multiple simultaneous focal planes to an imaging device, using pairs of switched waveplates and LCPG lenses, having uneven spacing, and a controller thereof.

Additionally, there is no requirement that the N pairs of waveplates and LCPG lenses be equally spaced, that the focal lengths of the N pairs be equally spaced, or that the focal planes 408 be equally spaced. In some embodiments, it may be desirable to have uneven spacing of focal planes, for instance, forming a gradient of distances therebetween. In this way changing focal planes from extreme edges of a range of focal planes may proceed quickly as fewer planes may exist toward the peripheries, but then more granular adjustment may be possible toward a middle of the gradient of planes. In another example, the user may wish to view a combination of closely-spaced planes in one layer of the brain, then switch to another combination of closely spaced planes in a much deeper layer. FIG. 6 provides one non-limiting example of how differences in distance 602, 604 between waveplates—LCPG lens pairs can be designed to enable different distances between focal planes 606, 608. In particular, the distance 602 between a first pair 1 and a second pair 2 is greater than a second distance 604 between the second pair 2 and a third pair 3. The result is a greater first distance 606 between a first focal plane and a second focal plane, than a second distance 608 between the second focal plane and a third focal plane.

Although this discussion has focused on waveplates as a polarization selector, in other embodiments, a polarization selector can include a waveplate switch, a passive waveplate, a segmented and/or pixelated waveplate, a gradient waveplate, a spatial light modulator, a polarizer, or a guest-host liquid crystal device.

Figure 7:
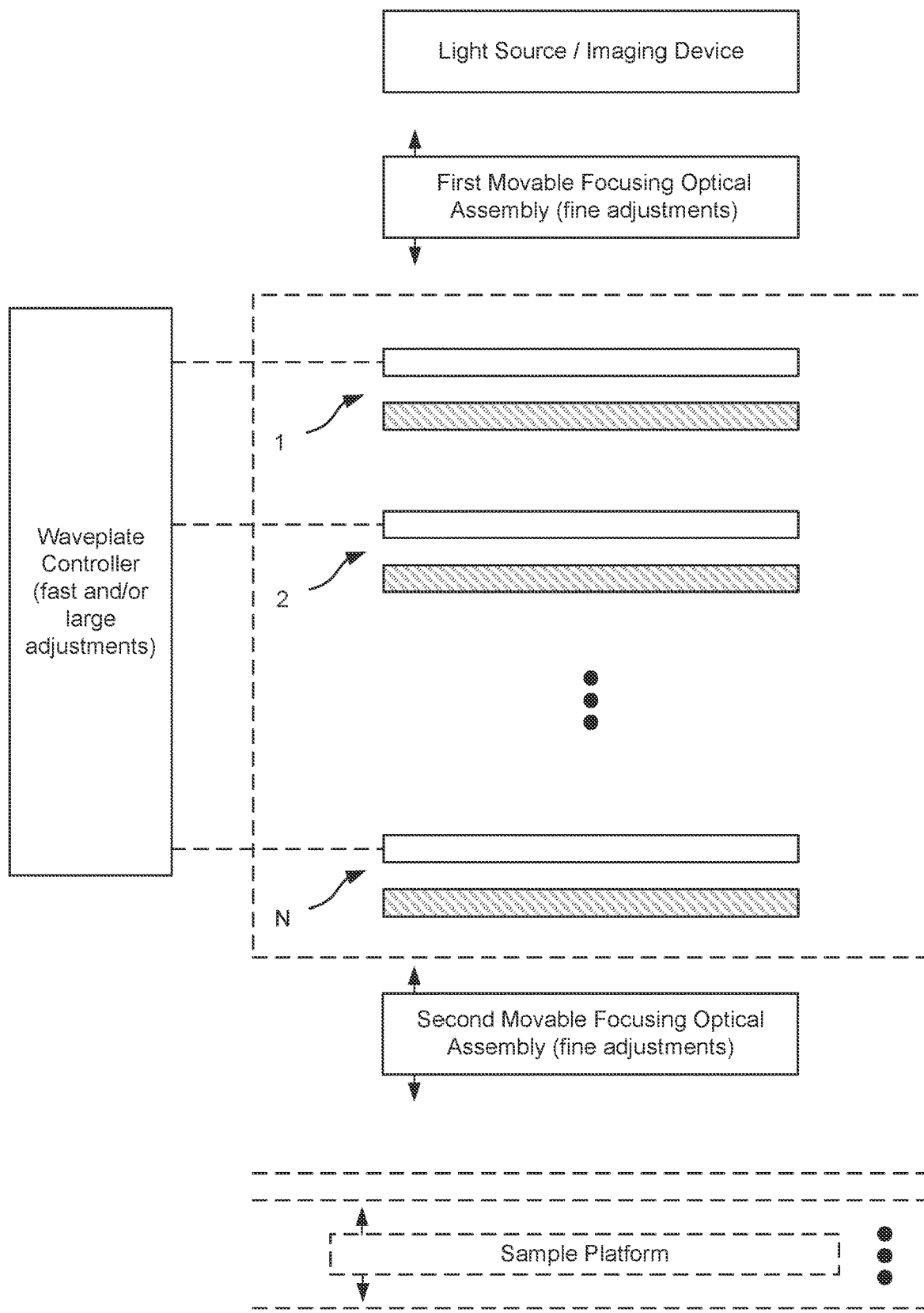
FIG. 7 illustrates another embodiment of an optical stack and controller thereof where movable focusing optical assemblies are used on either side of the optical stack.

Returning to FIG. 4, in some embodiments, the optical stack 402 could be combined with traditional optical components able to move, thereby providing two different mechanisms for changing a focal plane. For instance, mechanical movement of the entire system, or a traditional objective, or the sample platform could be used for large adjustment of the focal plane(s), while selection of different waveplates within the optical stack 402 could be used for more granular or precise adjustments. Since the optical stack 402 may entail costly production, which increases with increased N, it may be desirable to build an optical stack 402 large enough to provide precise adjustments in focal plane over a short range, while using less expensive physical adjustments of the system or sample platform to achieve larger and less precise changes in the focal plane(s). As just one example, FIG. 7 shows an assembly where the waveplate controller can make fine adjustments to focal plane via selection of one of N waveplates to have a quarter wave or three-quarter wave value, while all other waveplates have a half wave value, and where a first movable focusing optical assembly or a second movable optical assembly or the sample platform can make larger adjustments to the focal plane(s) via physical movement. More specifically, this disclosure may be used in combination with other steering or focusing optics, for example, sample stage or galvanometer xy scanning, or motorized/piezo z focus adjustment, to name a few non-limiting examples. Although not shown, the waveplate controller can be electrically coupled to the focusing optical assemblies to control movement thereof. It should be appreciated that although the movable focusing optical assemblies and the sample platform are described as being able to perform finer adjustments to focal plane(s), in other embodiments, the waveplates or other polarization controllers may be able to carry out finer adjustments to the focal plane(s).

The embodiments disclosed herein can be used to simultaneously focus illumination or excitation light to one or more focal planes, or may be used to simultaneously focus an imaging system to one or more focal planes.

Figure 12:
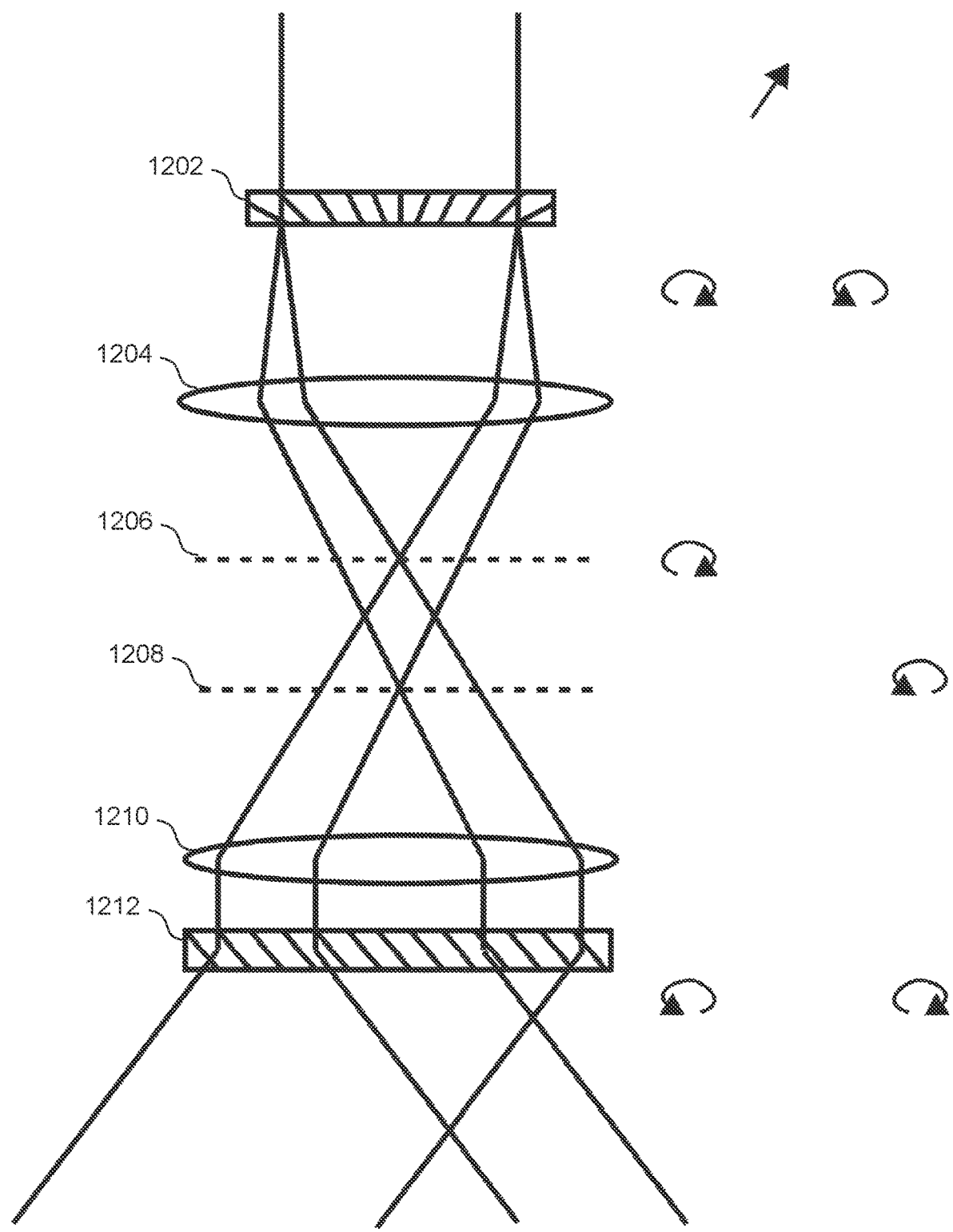
FIG. 12 illustrates an embodiment of an optical stack using a segmented waveplate and a linear LCPG to spatially separate beams having different focal planes.

This disclosure may produce polarization contrast between the planes of illumination or excitation light, or may allow an imaging system to preferentially collect different polarizations of light. These polarizations are naturally LCP or RCP but can be changed with the use of a waveplate into orthogonal linear polarizations, or other polarization states. In combination with polarization-preserving processes, such as second harmonic generation, and/or samples with polarization properties, such as collagen, the signals from differently-polarized planes could be separated using polarization rotation and/or polarizers (see, e.g., FIG. 12). This would be useful for example for differentiating signals from sources in multiple focal planes using a single-pixel detector, confocal microscope, or polarizing camera. For instance, in FIG. 12 an LCPG 1202 receives incident linearly-polarized light and produces two beams of opposite circularly-polarized light that enter a focusing optical device 1204, such as a lens. The focusing optical device 1204 focuses the two beams to two distinct focal planes 1206, 2108. A sensor placed after the collecting device 1210 might have difficulty distinguishing between the two beams, so to improve separation, the beams are directed through a linear LCPG 1212 after collection by a collecting device 1210. In this way, the two beams are spatially separated when they emerge from the linear LCPG 1212 and a sensor or two sensors could more easily identify the distinct beams originating from the focal planes 1206, 1208.

Figure 8:
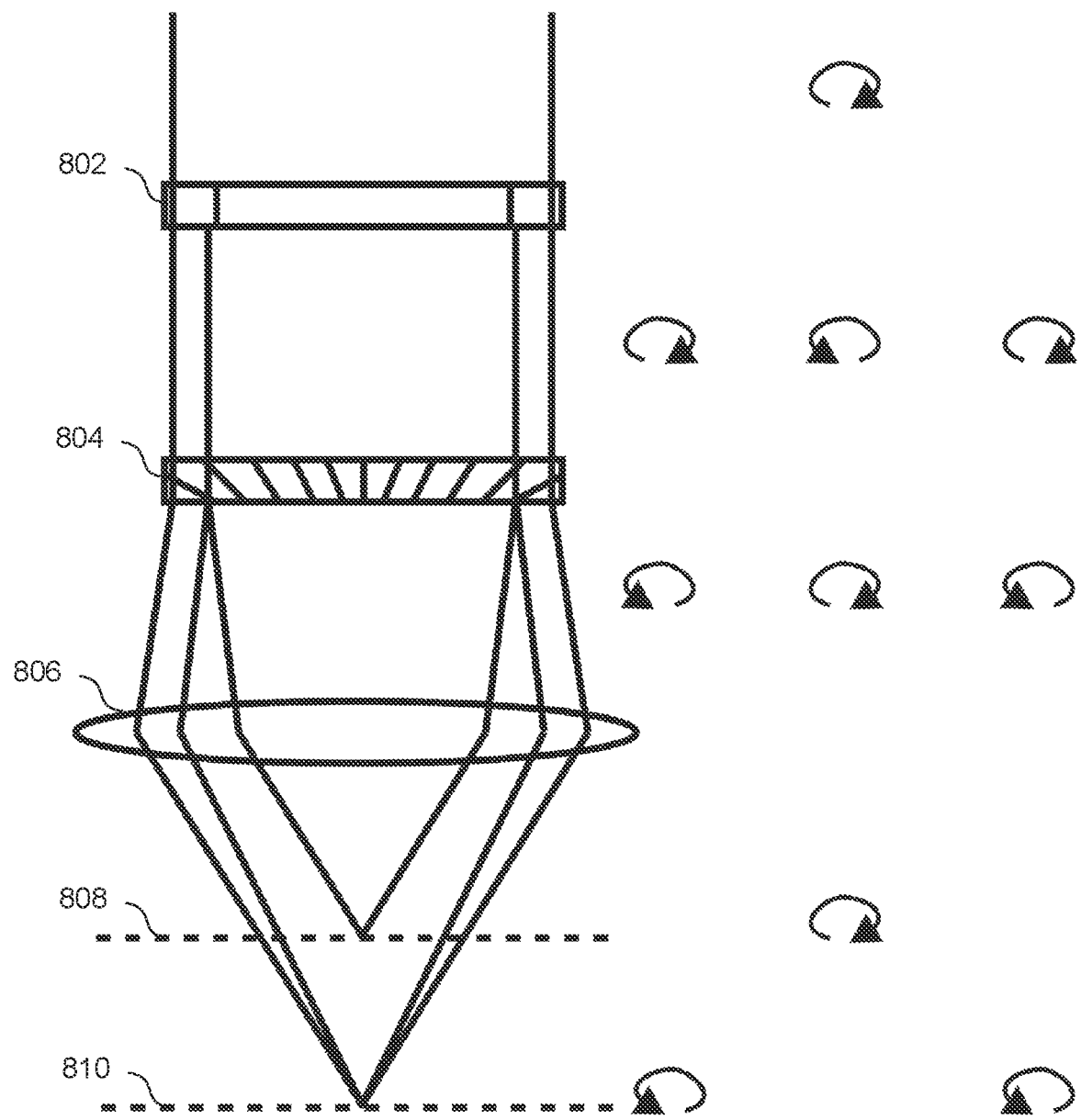
FIG. 8 illustrates an embodiment of an optical stack including an LCPG lens and a segmented waveplate in a first state.

FIG. 8 illustrates an embodiment of an optical stack followed by a focusing optical assembly and one or more focal planes. Here the optical stack comprises a non-uniform waveplate switch 802, such as a segmented or gradient waveplate switch. A non-uniform waveplate switch 802 allows different regions of the waveplate switch 802 to be switched independently from the other regions. As shown, right-hand circularly polarized light is incident on the non-uniform waveplate switch 802, but due to, for instance, different segments of the switch 802, the emerging light is right- or left-hand circularly polarized, depending on location (outer regions of the beam are right-hand circularly polarized and the center is left-hand circularly polarized). Due to this different handedness at different regions across the waveplate switch 802, the polarization grating 804 has different diffractive effects on the different regions of incident light, for instance, causing the right-hand circularly polarized outer beams to diffract outward and the left-hand circularly-polarized inner beam to diffract inward. The focusing optical assembly 806 then focuses the different beams to two distinct focal planes 808, 810 with an illumination of each focal plane dependent on the size of regions in the switch 802. One application is the ability to control an illumination of each focal plane. Here, for instance, greater illumination is achieved on the lower focal plane. Additional variations on the amount of illumination sent to different focal planes is also achievable via a non-uniform waveplate switch, and different illuminations can be selected for different focal planes when two or more focal planes are implemented. In one application where different focal planes are being interrogated, it may be useful to apply different illumination to the different focal planes to avoid strong signals overwhelming weaker signals (e.g., in microscopy). Special cases of this embodiment include phase-contrast and darkfield imaging of one or more focal planes.

In another alternative, the non-uniform waveplate switch 802 can take the form of an annular segmented waveplate switch, where the illumination from each segment reaches the sample plane(s) 808, 810 with a different radial frequency, as well as with a different degree of convergence. The result is that different sample or focal planes 808, 810 can be frequency-tagged, which can aid in disambiguation of simultaneous laterally-overlapping signals.

Figure 9:
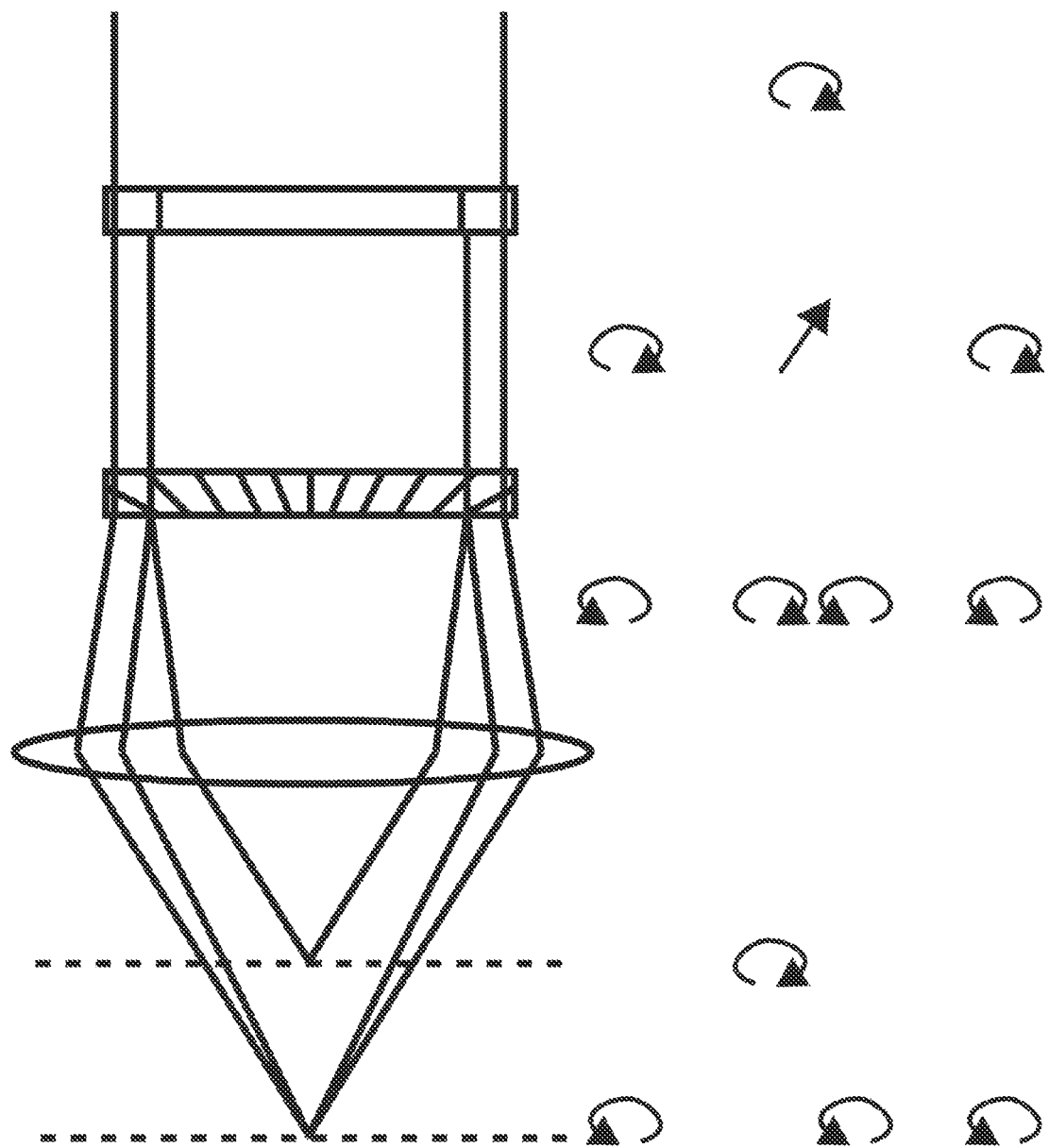
FIG. 9 illustrates the optical stack of FIG. 8 where the segmented waveplate is in a second state.

FIG. 9 is similar to FIG. 8, but with the segmented waveplate having a quarter wave segment in the middle. As a result, incident right-hand circularly polarized light turns to left-hand circularly polarized light (outer beams) and linearly-polarized light (central beam). In this configuration, light originating from the center segment of the waveplate contributes to the illumination at both focal planes rather than at just one focal plane. By switching the segmented waveplates between the configurations in FIGS. 8 and 9, the amounts of illumination in the focal planes can be adjusted.

These concepts have been drawn for epi illumination (reflective optics), but it should be apparent to those of skill in the art that this can also be applied to collection paths, as well as trans illumination and/or collection paths. For instance, the optical system of FIG. 4 could include an imaging sensor above the focal planes 408 (for epi illumination) or below the focal planes 408 (for trans illumination). Similarly, a light source in FIG. 5 could be arranged below the focal planes (for trans illumination), or above the focal planes (for epi illumination). These same variations could also be applied to FIGS. 6, 7, 10, and 11 based on the teachings in this disclosure.

The focusing/imaging lenses may be single optical elements as drawn, microscope objectives, condenser lenses, and/or combinations of multiple optical elements. For example, in FIG. 4 the focusing optical assembly 412 may be a condenser lens, such that the optical stack 402 changes the location and/or angular pattern of illumination on the sample. As another example, in FIG. 5, the focusing optical assembly 512 may be a microscope objective or a camera lens or an optical fiber with attached ball lens or GRIN lens, among other possibilities. More specifically, the optical stack discussed throughout this disclosure could be attached to or fabricated on (e.g., deposited) on an aperture of an optical fiber.

Figure 10:
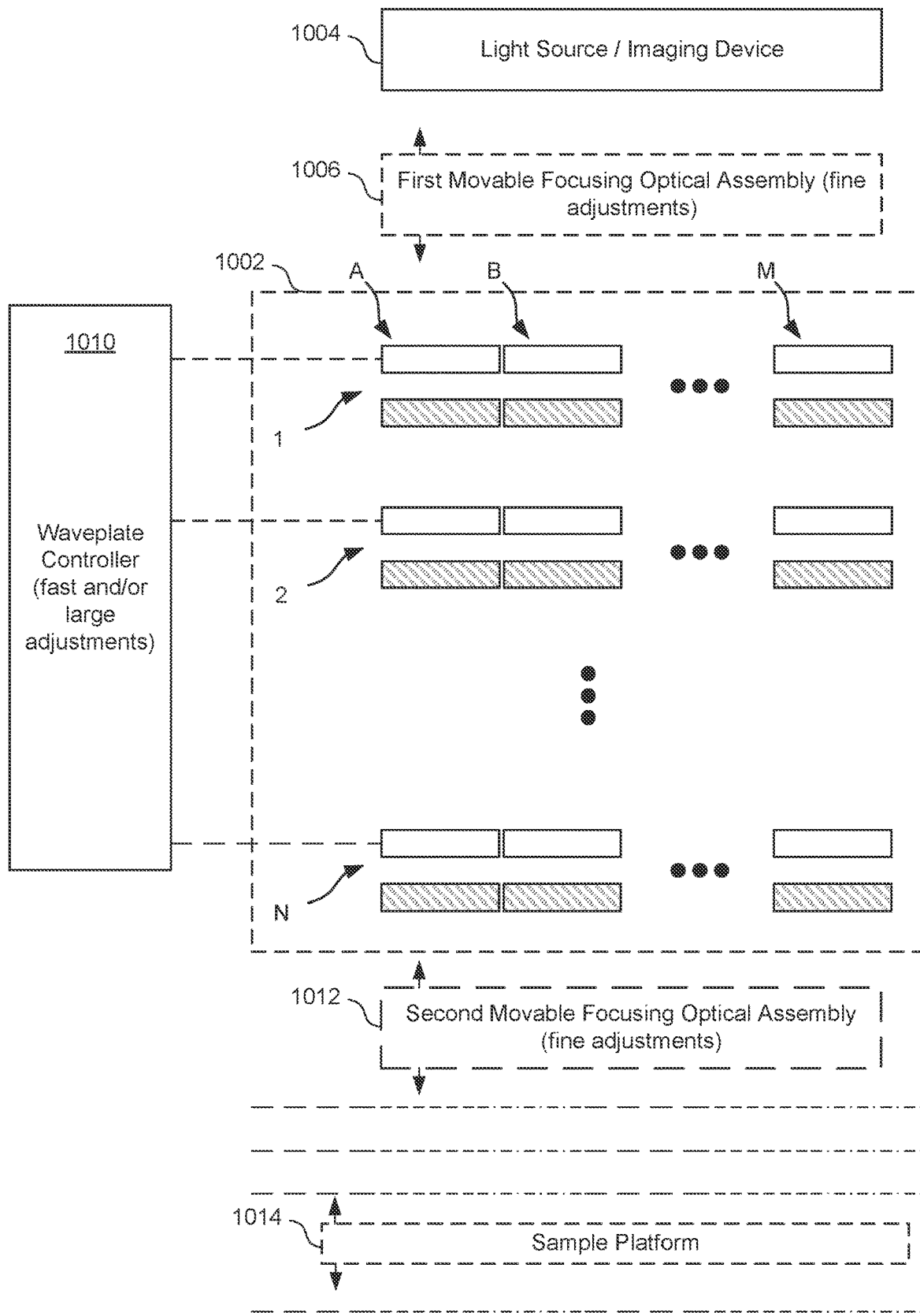
FIG. 10 illustrates a more generalized optical assembly having an optical stack with segmented waveplates and a controller thereof.

FIG. 10 presents a more generalized view of the optical stack in FIGS. 8 and 9. Here, the optical stack 1002 is formed from two or more pairs of waveplates and LCPG lenses, where the number of pairs is N and N can be any integer including 2. The waveplates in each of the N pairs can be switched and segmented, for instance formed from segments A, B, . . . , and M. The waveplate controller 1010 can provide control signals for controlling switching of not only each waveplate, but also each segment within each waveplate. The system can also include a light source 1004, an optional first focusing optical assembly 1006, an optional second focusing optical assembly 1012, and one or more focal planes (not shown). Selection of N and M during design of the optical stack 1002 provides a way to select a number of focal planes. The size of each segment A, B, . . . , and M may or may not be uniform, or may vary from switch to switch (e.g., with a first switch having uniformly-sized segments and the second switch having non-uniformly-sized segments). Additionally, the system may include an optional adjustable sample platform 1014, similar to that seen in FIG. 7, where adjustments of the sample platform 1014 can achieve finer changes in focal plane than the stack 1002, while adjustments to the waveplates can be used for more faster, larger, and less fine adjustments than the sample platform 1014. Adjustments to the first or second optional movable focusing optical assemblies 1006, 1012 can also be used to make finer changes to focal planes than is possible with changes to the waveplates. Although not shown, the waveplate controller 1010 can be electrically coupled to the focusing optical assemblies 1006 and 1012 to control movement thereof. It should be appreciated that although the movable focusing optical assemblies and the sample platform are described as being able to perform finer adjustments to focal plane(s), in other embodiments, the waveplates or other polarization controllers may be able to carry out finer adjustments to the focal plane(s).

As light is Fourier transformed through the optional second movable focusing optical assembly 1012, light from different segments of the waveplates is spatially overlapping when it reaches the one or more focal planes. An accurate way to visually represent this is difficult, so different dashed lines have been used across each focal plane to help symbolize angular frequency differences between each focal plane.

Figure 11:
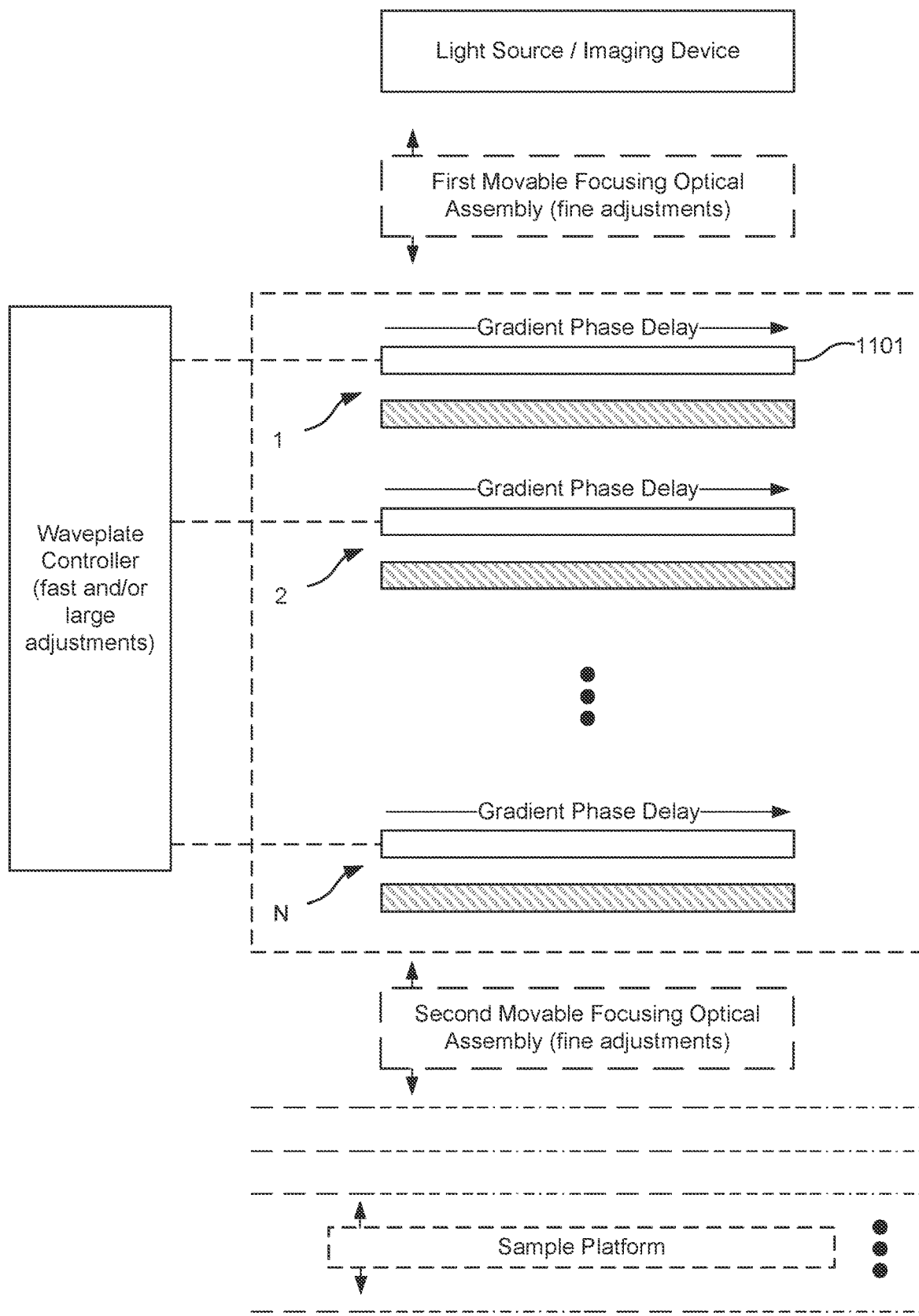
FIG. 11 illustrates a more generalized optical assembly having an optical stack with gradient waveplates and a controller thereof.

FIG. 11 illustrates an embodiment of an optical stack where the waveplates 1101 are gradient waveplates, meaning that each waveplate has a spatial function of phase delay. This function can be linear, exponential, or follow any other changing form across the area of the waveplate. The effect of gradient waveplates is a spatially varying proportion of the two possible output divergences of each LCPG lens. So, the light originating from one edge of the lens might be diverging, the light originating from the other edge might be converging, and the light at the center might be contributing both to converging and diverging beams. This xy spatial distribution lasts until the beams enter the optional second movable focusing assembly. Then, as in FIG. 10, a Fourier transform will cause the beams to be mostly spatially overlapping once they emerge. An accurate way to visually represent this is difficult, so different dashed lines have been used across each focal plane to help symbolize angular frequency differences between each focal plane. Although not shown, the waveplate controller can be electrically coupled to the focusing optical assemblies and/or the sample platform to control movement thereof. It should be appreciated that although the movable focusing optical assemblies and the sample platform are described as being able to perform finer adjustments to focal plane(s), in other embodiments, the waveplates or other polarization controllers may be able to carry out finer adjustments to the focal plane(s).

FIG. 13 illustrates a first optical assembly, one or more focal planes, and a second optical assembly. The first optical assembly 1350 is similar to the one seen in FIG. 4, including a light source 1304, an optional first focusing optical assembly 1306, a stack 1302, a first waveplate controller 1310 configured to control the waveplates, and an optional second focusing optical assembly 1312. The optical stack 1302 can include two or more pairs of waveplates (or other polarization controllers) and LCPG lenses, where the number of pairs is N and N can be any integer of 1 or more (N=1 is possible where incident light is linear). The waveplates in each of the N pairs can be switched or fixed, and if switched, then the first waveplate controller 1310 can provide control signals for switching those of the waveplates that are switchable. Between the one or more focal planes 1308 and the optical stack 1302, can be a second optional focusing optical assembly 1312. Selection of N during design of the optical stack 1302 provides a way to select a maximum number of focal planes that the optical stack 1302 can achieve, namely $2^N$. Given this maximum, if one or more of the waveplates are switchable, then the number of focal planes can be adjusted during operation to values between 1 and $2^N$, and the system can select and weight different ones, pairs, etc. of the focal planes for imaging at the same time, thereby allowing variable depth of imaging in multiple simultaneous planes. In other words, and assuming one or more switchable waveplates, the first waveplate controller 1310 can be used to adjust a number of focal planes from 1 to $2^N$ during operation of the system in FIG. 13. Changes between numbers of focal planes can be made as fast as the first waveplate controller 1310 and/or waveplates can switch. The first waveplate controller 1310 can also be used to adjust the focal planes being imaged at any time, for instance, allowing an imaging device 1322 to follow an entity moving vertically through a fluid, or to focus on two or more different entities at different depths moving vertically through a fluid, or to very rapidly switch the focus between these different entities at different depths, to name a few non-limiting examples.

Furthermore, as N increases, the number of focal planes increases by up to 2 to the power of N. Some use cases may not call for many focal planes to be used at the same time, but instead may call for different combinations of the planes to be selected in rapid succession or at least to allow rapid selection between two or more of a large number of focal planes. For instance, in medical imaging there may be a desire to view one or two focal planes at a time, and to switch between focal planes that are spaced by mere microns from each other. Such an application could see the first waveplate controller 1310 switching all but one waveplate (or two, or three, etc.) to a half wave value, or net zero phase delay, and switching one of the waveplates to a quarter wave or three-quarter wave value. A medical imaging technician may want to see different layers within tissue, and by adjusting a digital "knob" they may instruct the first waveplate controller 1310 to switch "on" a given one of the waveplates, where that waveplate is set to a quarter wave or three-quarter wave value while all remaining waveplates are set to a half wave value. In this way a user can rapidly switch between focal planes, or seemingly adjust a focus of an imaging device, without the imaging device seeing any movement of components. This not only could allow greater longevity of the device and more rapid switching between focus planes, but may also cut down on vibration that is often associated with changing focal planes using traditional mechanical lens or sample adjustments—vibrations that are amplified when magnification is involved. The device's focusing behavior will also be independent of gravitational effects that degrade the performance of liquid lenses for focusing in orientations other than vertical.

While FIG. 4 was discussed in terms of also using an optional imaging device, FIG. 13 illustrates a specific embodiment where trans illumination is desired. In this use case, the light source 1304 projects focused light onto one or more focal planes 1308 selected by the first waveplate controller 1310. An imaging device 1322, that is part of the second optical system 1352, is arranged on an opposing side of the one or more focal planes 1308 to image the light at the one or more focal planes 1308. However, the second optical system 1352 also includes first and second optical assemblies 1316 and 1320 that can be arranged on either side of a stack 1314, where the optical properties of the stack 1314 are controlled by a second waveplate controller 1318. The optical stack 1314 can include two or more pairs of waveplates (or other polarization controllers) and LCPG lenses, where the number of pairs is N and N can be any integer of 1 or more (N=1 is possible where incident light is linear). The waveplates in each of the N pairs can be switched or fixed, and if switched, then the second waveplate controller 1318 can provide control signals for switching those of the waveplates that are switchable. This embodiment allows multiple focal planes 1308 to be illuminated, and also for the second optical system 1352 to selectively image some or all of the one or more focal planes 1308. Although not shown, the waveplate controller 1310 can be electrically coupled to the focusing optical assemblies 1306 and 1312 to control movement thereof, and the waveplate controller 1318 can be electrically coupled to the focusing optical assemblies 1316 and 1320 to control movement thereof. Further, while two separate controllers 1310 and 1318 are shown, in some embodiments, the functionality of these two controllers 1310 and 1318 can be combined into a single controller.

Figure 14:
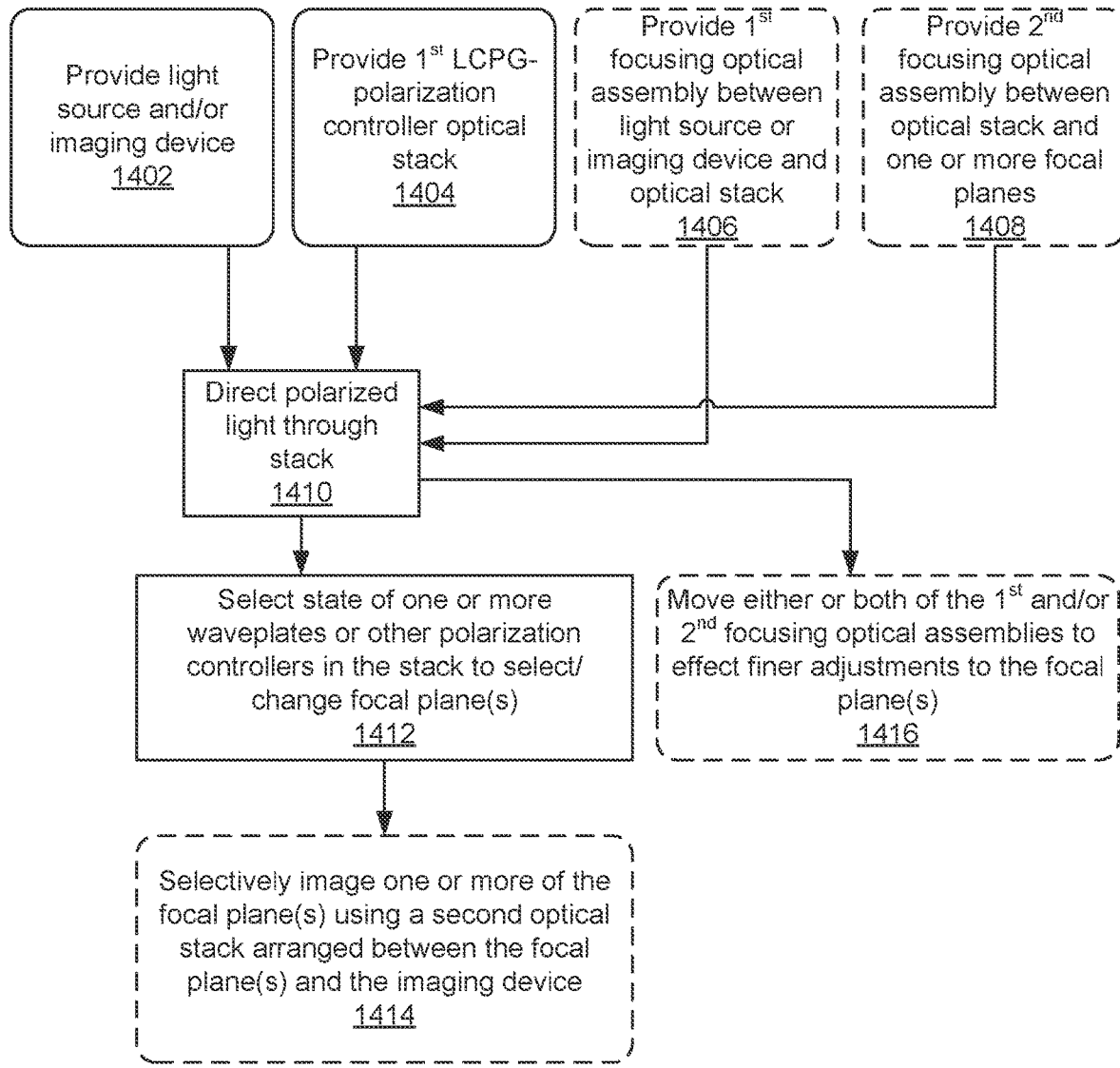
FIG. 14 illustrates an embodiment of a method for using an optical stack of LCPG lenses and waveplates (or other polarization controllers) to effect and control a number and location of focal planes to be illuminated or imaged by a light source or imaging device, respectively.

FIG. 14 illustrates an embodiment of a method for using an optical stack of LCPG lenses and waveplates (or other polarization controllers) to effect and control a number and location of focal planes to be illuminated or imaged by a light source or imaging device, respectively. The method 1400 can provision a light source and or imaging device (Block 1402). If both are provided, then they should be arranged on the same side of the one or more focal planes for epi illumination, and on opposing sides of the one or more focal planes for trans illumination. At Block 1404, the method 1400 can also provision a first LCPG-polarization controller optical stack (e.g., 402 or 1302 to name two examples) between the one or more focal planes and the light source or imaging device, for instance as seen in FIGS. 4 and 5. A first focusing optical assembly can optionally be arranged between the light source or imaging device and the first stack (optional Block 1406) and a second focusing optical assembly can be arranged between the stack and the one or more focal planes (optional Block 1408). Light can be directed through the stack (Block 1410), where the light source either produces the desired polarization of light or a waveplate (e.g., a half waveplate) or other polarization controller is used to convert light from the light source into the desired polarization of light before it reaches the stack. The state of one or more of the polarization controllers in the optical stack can be selectively changed to control a number and location of the one or more focal planes (Block 1412). For instance, multiple focal planes can be established simultaneously or rapid switching between different focal planes can be implemented. Additionally, rapid switching between multiple sets of focal planes at the same time can be implemented. In some embodiments, the waveplates can be of a segmented or gradient type, and each segment or section of the gradient can be individually controlled providing further spatial control of the focal plane(s).

In some embodiments, a second optical stack can be arranged on an opposing side of the one or more focal planes from the first optical stack and through control of this second optical stack, the imaging device can selectively image one or more of the one or more focal planes (optional Block 1414). This may include imaging all or less than all focal planes that are illuminated.

It will be appreciated that although most of the figures show incident circularly-polarized light on the optical stack, in some embodiments, linear or other polarizations of light may also be incident on the stack, and with proper design, multiple output focal planes can still be achieved.

The foregoing is illustrative of the present disclosure and is not to be construed as limiting thereof. Although a few exemplary embodiments of this disclosure have been described, those skilled in the art will readily appreciate that many modifications are possible in the exemplary embodiments without materially departing from the novel teachings and advantages of this disclosure. For example, the LCPG Lens(es) and/or waveplate(s) (or other polarization controller(s)) may be placed near a last lens of the focusing optical system, for example at or near the back aperture of a microscope objective, or at a conjugate plane to this location (e.g., see FIG. 5). The illustrations show a combination of two waveplates and two LCPG Lenses, but it can be readily appreciated that combinations of different numbers of waveplates (or other polarization controller(s)) and LCPG lenses, including many more waveplates (or other polarization controller(s)) and LCPG lenses, can be employed (e.g., see FIG. 4). Each waveplate (or other polarization controller) may act as a zero-phase retarder, a QWP, a HWP, or some other retarder, at different times to change the number, locations, and/or polarizations of focal planes.

Given the speed at which non-mechanical changes in focal plane(s) can be achieved via the embodiments described herein, especially relative to FIGS. 4-7, 10-11, and 13, these optical systems can also be referred to as dynamic focusing systems.

This disclosure discusses focusing onto multiple planes that are typically perpendicular to the axis of light propagation or at least to a general propagation direction of light, even if some off-axis beam steering is involved. However, the specific type of focusing onto a given plane is not limited. For instance, focusing could involve focus to a single point on the focal plane or to a line segment on the given focal plane.

In some cases, the optical stacks disclosed herein can be attached to or deposited on a conventional lens, such as a convex glass lens. One of skill in the art will also appreciate that not all optical elements in the stack have to have the same dimensions. For instance, in a stack with three LCPG-waveplate pairs, each successive pair could have a decreasing radius or aperture.

This disclosure has generally referred to "light" or "light beams" or "beams of light." In implementation, this light or light beams may or may not be collimated, depending on the application. For instance, in a focusing application, the incident light beam may be collimated or uncollimated, but either way, exits the optics in a focused manner. Similarly, for beam steering applications, the incident and exiting light may both be collimated. These are just two non-limiting examples to show that the application will determine whether light or light beams or beams of light refer to collimated or non-collimated light.

Figure 15:
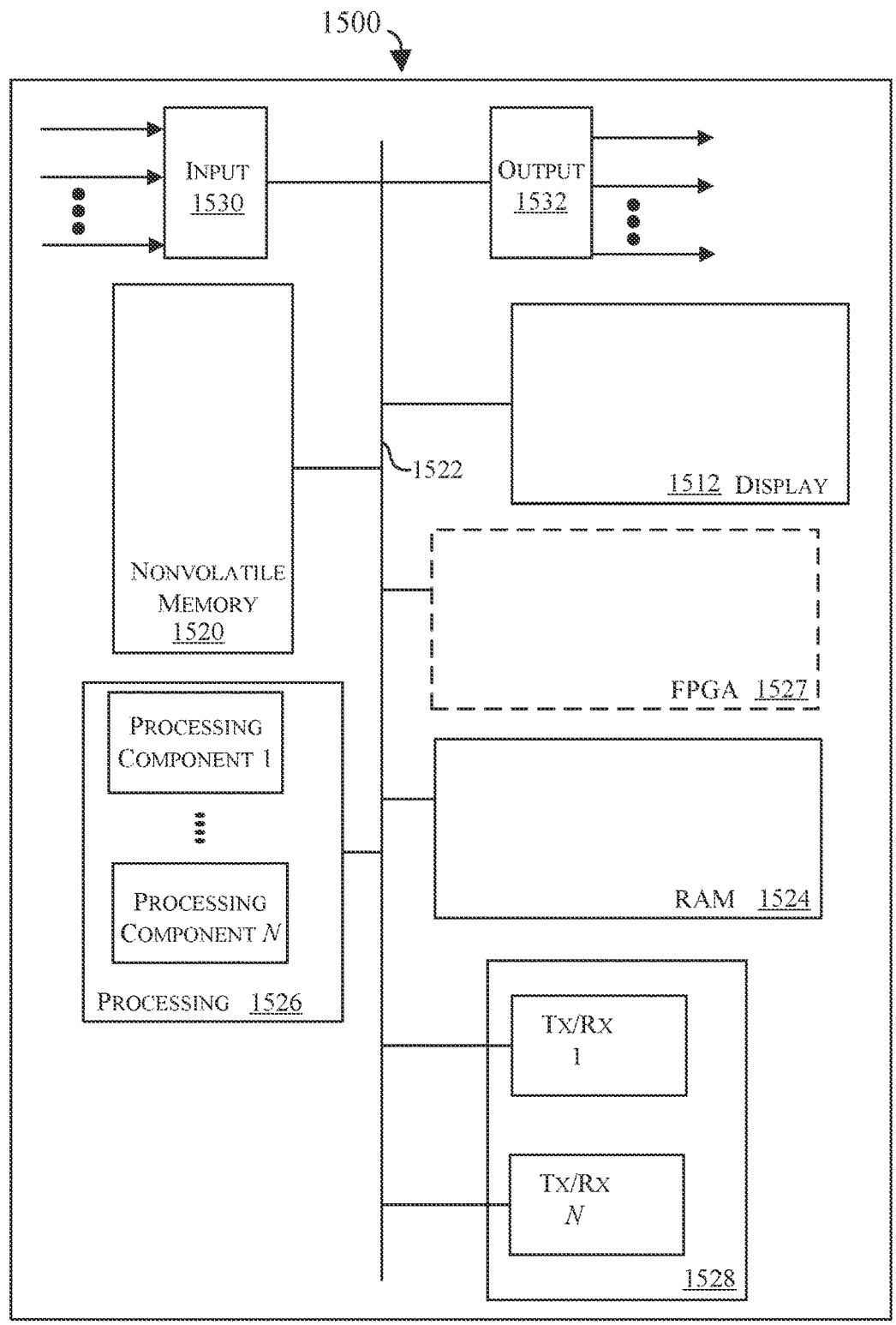
FIG. 15 is a block diagram depicting physical components that may be utilized to realize the waveplate controller, and any of the waveplate controllers discussed and shown herein according to an exemplary embodiment.

The methods described in connection with the embodiments disclosed herein may be embodied directly in hardware, in processor-executable code encoded in a non-transitory tangible processor readable storage medium, or in a combination of the two. Referring to FIG. 15 for example, shown is a block diagram depicting physical components that may be utilized to realize the waveplate controller 410, and any of the waveplate controllers discussed and shown herein according to an exemplary embodiment. As shown, in this embodiment an optional display portion 1512 and nonvolatile memory 1520 are coupled to a bus 1522 that is also coupled to random access memory ("RAM") 1524, a processing portion (which includes N processing components) 1526, an optional field programmable gate array (FPGA) 1527, and a transceiver component 1528 that includes N transceivers. Although the components depicted in FIG. 15 represent physical components, FIG. 15 is not intended to be a detailed hardware diagram; thus many of the components depicted in FIG. 15 may be realized by common constructs or distributed among additional physical components. Moreover, it is contemplated that other existing and yet-to-be developed physical components and architectures may be utilized to implement the functional components described with reference to FIG. 15.

This optional display portion 1512 generally operates to provide a user interface for a user, and in several implementations, the display is realized by a touchscreen display. In general, the nonvolatile memory 1520 is non-transitory memory that functions to store (e.g., persistently store) data and processor-executable code (including executable code that is associated with effectuating the methods described herein). In some embodiments for example, the nonvolatile memory 1520 includes bootloader code, operating system code, file system code, and non-transitory processor-executable code to facilitate the execution of a method for using an optical stack of LCPG lenses and waveplates (or other polarization controllers) to effect and control a number and location of focal planes to be illuminated or imaged by a light source or imaging device, respectively, described with reference to FIG. 14 described further herein.

In many implementations, the nonvolatile memory 1520 is realized by flash memory (e.g., NAND or ONENAND memory), but it is contemplated that other memory types may be utilized as well. Although it may be possible to execute the code from the nonvolatile memory 1520, the executable code in the nonvolatile memory is typically loaded into RAM 1524 and executed by one or more of the N processing components in the processing portion 1526.

The N processing components in connection with RAM 1524 generally operate to execute the instructions stored in nonvolatile memory 1520 to enable a method for using an optical stack of LCPG lenses and waveplates (or other polarization controllers) to effect and control a number and location of focal planes to be illuminated or imaged by a light source or imaging device, respectively. For example, non-transitory, processor-executable code to effectuate the methods described with reference to FIG. 14 may be persistently stored in nonvolatile memory 1520 and executed by the N processing components in connection with RAM 1524. As one of ordinarily skill in the art will appreciate, the processing portion 1526 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 1526 may be configured to effectuate one or more aspects of the methodologies described herein (e.g., the method described with reference to FIG. 14). For example, non-transitory processor-readable instructions may be stored in the nonvolatile memory 1520 or in RAM 1524 and when executed on the processing portion 1526, cause the processing portion 1526 to perform a method for using an optical stack of LCPG lenses and waveplates (or other polarization controllers) to effect and control a number and location of focal planes to be illuminated or imaged by a light source or imaging device, respectively. Alternatively, non-transitory FPGA-configuration-instructions may be persistently stored in nonvolatile memory 1520 and accessed by the processing portion 1526 (e.g., during boot up) to configure the hardware-configurable portions of the processing portion 1526 to effectuate the functions of the waveplate controllers (e.g., 410, 1310, and 1318).

The input component 1530 operates to receive signals (e.g., user inputs regarding desired focal plane(s)) that are indicative of one or more aspects of the one or more focal planes to be achieved by control of the waveplates or other polarization controllers. The signals received at the input component may include, for example, keystroke signals from a keyboard or selection signals from a touchscreen. The output component generally operates to provide one or more analog or digital signals to effectuate an operational aspect of controlling the waveplates or other polarization controllers. For example, the output portion 1532 may provide the control signals to the waveplates 430 described with reference to FIG. 4.

The depicted transceiver component 1528 includes N transceiver chains, which may be used for communicating with external devices via wireless or wireline networks. Each of the N transceiver chains may represent a transceiver associated with a particular communication scheme (e.g., WiFi, Ethernet, Profibus, etc.).

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The terms and expressions employed herein are used as terms and expressions of description and not of limitation, and there is no intention, in the use of such terms and expressions, of excluding any equivalents of the features shown and described or portions thereof. Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, by way of example only, the disclosure of a "protrusion" should be understood to encompass disclosure of the act of "protruding"—whether explicitly discussed or not—and, conversely, were there only disclosure of the act of "protruding", such a disclosure should be understood to encompass disclosure of a "protrusion". Such changes and alternative terms are to be understood to be explicitly included in the description.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An optical system with a controllable liquid crystal polarization grating (LCPG) stack configured to produce or image two or more simultaneous focal planes, the optical system comprising:
   a first LCPG lens;
   a second LCPG lens;
   a first polarization controller configured to selectively adjust a polarization entering the first LCPG lens, and a second polarization controller configured to selectively adjust a polarization entering the second LCPG lens, thereby controlling a number and location of each of the two or more simultaneous focal planes.

2. The optical system of claim 1, wherein the two or more simultaneous focal planes have polarization contrast.

3. The optical system of claim 1, wherein the first and second LCPG lenses are individually-controllable.

4. The optical system of claim 1, wherein the first and second LCPG lenses are arranged between two or more lenses of a microscope.

5. The optical system of claim 4, wherein the first LCPG lens is arranged at or near a back aperture of a microscope objective or at or near a conjugate to a plane of the microscope objective.

6. The optical system of claim 5, wherein the second LCPG lens is arranged at or near a back aperture of the microscope objective or at or near the conjugate to the plane of the microscope objective.

7. The optical system of claim 6, wherein the second polarization controller is arranged at or near the back aperture of the microscope objective or at or near the conjugate to the plane of the microscope objective.

8. The optical system of claim 1, wherein the first polarization controller is arranged at or near a back aperture of a microscope objective or at or near a conjugate to a plane of the microscope objective.

9. The optical system of claim 8, wherein mechanical adjustment of the controllable LCPG stack, an objective of the microscope, or a sample of the microscope is used for finer adjustment of the two or more simultaneous focal planes while waveplate control is used for one or more of faster adjustments and larger adjustments.

10. The optical system of claim 1, wherein at least one of the first or the second polarization controllers is non-uniform.

11. The optical system of claim 10, wherein at least one of the first or the second polarization controllers is a segmented waveplate or a gradient waveplate.

12. The optical system of claim 11, wherein an illumination of each of the two or more simultaneous focal planes is dependent upon a size and number of controlled regions in the segmented waveplate.

13. The optical system of claim 11, wherein the optical system is part of a phase-contrast or darkfield imaging system.

14. The optical system of claim 1, wherein the two or more simultaneous focal planes are frequency tagged.

15. The optical system of claim 1, wherein at least one of the first or the second polarization controllers is selected from: a waveplate switch, a passive waveplate, a segmented and/or pixelated waveplate, a gradient waveplate, a spatial light modulator, a polarizer, and a guest-host liquid crystal device.

16. A dynamic focusing system comprising:
a light source;
an imaging sensor;
a first liquid crystal polarization grating (LCPG) lens;
a first polarization controller configured to control a polarization of polarized light entering the first LCPG lens;
a second LCPG lens;
a second polarization controller configured to control a polarization of polarized light entering the second LCPG lens;
a waveplate controller electrically coupled to the first and second polarization controllers and configured to control a state of the first polarization controller and a state of the second polarization controller to control two or more simultaneous focal planes of the dynamic focusing system.

17. The dynamic focusing system of claim 16, wherein the light source and the imaging sensor are on opposing sides of the two or more simultaneous focal planes.

18. The dynamic focusing system of claim 17, wherein the light source and the imaging sensor are separated from the two or more simultaneous focal planes by at least a third LCPG lens and a third polarization controller.

19. The dynamic focusing system of claim 16, wherein the light source and the imaging sensor are on the same side of the two or more simultaneous focal planes.

20. The dynamic focusing system of claim 16, wherein the waveplate controller is configured to select a number and location of each of the two or more simultaneous focal planes.

21. The dynamic focusing system of claim 16, wherein at least one of the first and second polarization controllers is non-uniform.

22. The dynamic focusing system of claim 16, wherein the two or more simultaneous focal planes have polarization contrast.

23. The dynamic focusing system of claim 16, wherein the two or more simultaneous focal planes exist simultaneously.

24. The dynamic focusing system of claim 16, wherein the first and second LCPG lenses are individually-controllable.

25. The dynamic focusing system of claim 16, wherein the first and second LCPG lenses are arranged between two or more lenses of a microscope.

26. The dynamic focusing system of claim 25, wherein the first LCPG lens is arranged at or near a back aperture of a microscope objective or at or near a conjugate to a plane of the microscope objective.

27. The dynamic focusing system of claim 26, wherein the second LCPG lens is arranged at or near a back aperture of the microscope objective or at or near the conjugate to the plane of the microscope objective.

28. The dynamic focusing system of claim 27, wherein the first polarization controller is arranged at or near the back aperture of the microscope objective or at or near the conjugate to the plane of the microscope objective.

29. The dynamic focusing system of claim 16, wherein the first polarization controller is arranged at or near a back aperture of a microscope objective or at or near a conjugate to a plane of the microscope objective.

30. The dynamic focusing system of claim 29, wherein mechanical adjustment of a LCPG stack, an objective of the microscope, or a sample of the microscope, is used for finer adjustment of one or more simultaneous focal planes while waveplate control is used for one or more of faster adjustments and larger adjustments, and wherein the LCPG stack comprises at least the first LCPG lens, the second LCPG lens, the first polarization controller, and the second polarization controller.

31. The dynamic focusing system of claim 16, wherein at least one of the first and the second polarization controllers is non-uniform.

32. The dynamic focusing system of claim 31, wherein at least one of the first and the second polarization controllers is a segmented waveplate or a gradient waveplate.

33. The dynamic focusing system of claim 32, wherein an illumination of each of the two or more simultaneous focal planes is dependent upon a size and number of controlled regions in the segmented waveplate.

34. The dynamic focusing system of claim 32, wherein the dynamic focusing system is part of a phase-contrast or darkfield imaging system.

35. The dynamic focusing system of claim 16, wherein the two or more simultaneous focal planes are frequency tagged.

36. The dynamic focusing system of claim 16, wherein at least one of the first and second polarization controllers is selected from: a waveplate switch, a passive waveplate, a segmented and/or pixelated waveplate, a gradient waveplate, a spatial light modulator, a polarizer, and a guest-host liquid crystal device.

37. A method of dynamic focusing to produce or image two or more simultaneous focal planes, the method comprising:
providing a light source or imaging device;
providing a first liquid crystal polarization grating (LCPG)-polarization controller optical stack comprising at least one LCPG and at least a first polarization controller;

providing a second LCPG-polarization controller optical stack comprising at least a second polarization controller;

directing polarized light through the first and second LCPG-polarization controller optical stacks; and selecting a state of the first and second polarization controllers to select a number and location of the two or more simultaneous focal planes.

38. The method of claim 37, further comprising providing a first focusing optical assembly between the light source or the imaging device and the first LCPG-polarization controller optical stack.

39. The method of claim 38, further comprising providing a second focusing optical assembly between the first LCPG-polarization controller optical stack and the two or more simultaneous focal planes.

40. The method of claim 39, further comprising moving either or both of the first and second focusing optical assemblies to effect finer adjustments to the two or more simultaneous focal planes.

41. The method of claim 37, further comprising providing a focusing optical assembly between the first LCPG-polarization controller optical stack and the two or more simultaneous focal planes.

42. The method of claim 37, further comprising selectively imaging one or more of the two or more simultaneous focal planes using the second LCPG-polarization controller optical stack arranged between the two or more simultaneous focal planes and the imaging device.

43. An optical system comprising:
a light source or imaging device;
a first liquid crystal polarization grating (LCPG)-polarization controller optical stack comprising at least one LCPG and at least a first polarization controller, and wherein polarized light is directed through the first LCPG-polarization controller optical stack;

a second LCPG-polarization controller optical stack comprising at least one LCPG and at least a second polarization controller, and wherein polarized light is directed through the second LCPG-polarization controller optical stack; and a waveplate controller comprising a non-transitory, tangible computer readable storage medium, encoded with processor readable instructions, wherein the waveplate controller is configured for dynamic focusing to produce or image two or more simultaneous focal planes, wherein the dynamic focusing is based at least in part on, instructing the first and second polarization controllers to switch between states thereby changing a number and/or location of the two or more simultaneous focal planes.

44. The optical system of claim 43, further comprising a first focusing optical assembly between the light source or the imaging device and the first LCPG-polarization controller optical stack.

45. The optical system of claim 44, further comprising a second focusing optical assembly between the first LCPG-polarization controller optical stack and the two or more simultaneous focal planes.

46. The optical system of claim 45, wherein the dynamic focusing is further based on moving either or both of the first and second focusing optical assemblies to effect finer adjustments to the two or more simultaneous focal planes.

47. The optical system of claim 43, further comprising a focusing optical assembly between the first LCPG-polarization controller optical stack and the two or more simultaneous focal planes.

* * * * *